US006852224B2

(12) United States Patent
Jagtoyen et al.

(10) Patent No.: US 6,852,224 B2
(45) Date of Patent: Feb. 8, 2005

(54) CARBON FIBER FILTERS

(75) Inventors: Marit Jagtoyen, Leawood, KS (US); Francis John Derbyshire, deceased, late of Lexington, KY (US); by Rosemary Anne Alexander Derbyshire, legal representative, Lexington, KY (US); Mario E. Tremblay, West Chester, OH (US); Steve G. Fishter, Harrison, OH (US); Dimitris I. Collias, Mason, OH (US)

(73) Assignees: The Procter & Gamble Company, Cincinnati, OH (US); The University of Kentucky Research Foundation, Lexington, KY (US)

( * ) Notice: Subject to any disclaimer, the term of this patent is extended or adjusted under 35 U.S.C. 154(b) by 0 days.

(21) Appl. No.: 10/649,710

(22) Filed: Aug. 27, 2003

(65) Prior Publication Data

US 2004/0040906 A1 Mar. 4, 2004

Related U.S. Application Data

(63) Continuation of application No. 10/321,214, filed on Dec. 17, 2002, now abandoned, which is a continuation of application No. 09/347,223, filed on Jul. 2, 1999, now abandoned.
(60) Provisional application No. 60/091,593, filed on Jul. 2, 1998.

(51) Int. Cl.[7] ............................................... B01D 39/00
(52) U.S. Cl. .................... 210/502.1; 210/503; 210/505; 428/315.5; 428/315.7; 442/334; 442/414
(58) Field of Search .............................. 210/496, 502.1, 210/503, 504, 505, 506, 507, 508; 428/304.4, 315.5, 315.7; 442/334, 414

(56) References Cited

U.S. PATENT DOCUMENTS

| | | | | |
|---|---|---|---|---|
| 5,972,253 A | * | 10/1999 | Kimber | ...................... 264/29.7 |
| 6,030,698 A | * | 2/2000 | Burchell et al. | .......... 428/315.5 |
| 2003/0136728 A1 | * | 7/2003 | Jagtoyen et al. | .......... 210/502.1 |

* cited by examiner

Primary Examiner—Robert James Popovics
(74) Attorney, Agent, or Firm—Frost Brown Todd LLC

(57) ABSTRACT

Disclosed is a filter comprised of activated carbon fibers, wherein said filter has a Virus Removal Index (hereafter "VRI") of at least about 99%, as measured in accordance with the test method described in the specification. The filter may comprise unbound fibers, or the fibers may be bound with a binder to form a composite of fibers. Also disclosed is a method of removing viruses from a liquid, the method comprising contacting the liquid with a filter comprising activated carbon fibers wherein said filter has a VRI of at least about 99%. Also described is an article of manufacture comprising: (a) a filter comprising activated carbon fibers, wherein said filter has a VRI of at least about 99%; and (b) instructions which inform a user that the filter may be used to remove viruses from a liquid.

26 Claims, 8 Drawing Sheets

CARBON FIBER FILTERS

CROSS REFERENCE TO RELATED APPLICATIONS APPLICATIONS

This is a continuation of Application Ser. No. 10/321,214, filed Dec. 17, 2002, now abandoned, which is a continuation of Ser. No. 09/347,223, filed Jul. 2, 1999 now abandoned, which is a continuation-in-part patent application which claims the benefit of (1) U.S. Provisional Patent Application Ser. No. 60/091,593 filed Jul. 2, 1998; (2) U.S. patent application Ser. No. 08/935,631 filed Sep. 23, 1997 now U.S. Pat. No. 5,972,253, which claims priority to U.S. Provisional Patent Application Ser. No. 60/027,193, filed Sep. 30, 1996, entitled "Preparation of Monolithic Carbon Fiber Composite Material"; (3) U.S. patent application Ser. No. 08/747,109, filed Nov. 8, 1996 now U.S. Pat. No. 6,030,698, entitled "Activated Carbon Fiber Composite Material and Method of Making" which depends from U.S. patent application Ser. No. 08/358,857, filed Dec. 19, 1994, entitled "Activated Carbon Fiber Composite Material and Method of Making" now abandoned, and (4) U.S. Provisional Patent Application Ser. No. 60/132,309, filed May 3, 1999 by M. E. Tremblay et al., entitled "Filters for Removal of Pathogens from Liquids", the substances of which are incorporated herein by reference.

TECHNICAL FIELD

The present invention relates to filters capable of removing various contaminants, including pathogens, from fluids (air and liquids) by filtration. In particular, it relates to filters that comprise activated carbon fibers for removing a broad spectrum of contaminants, including viruses, from liquids. Additionally, the invention relates to a method of removing contaminants from liquids.

BACKGROUND OF THE INVENTION

Water may contain many different kinds of contaminants including, for example, particulates, harmful chemicals, and microbiological organisms, such as bacteria, parasites, protozoa and viruses. In a variety of circumstances, these contaminants must be removed before the water can be used. For example, in many medical applications and in the manufacture of certain electronic components, extremely pure water is required. As a more common example, any harmful contaminants must be removed from water before it is potable, i.e., fit to consume. Despite modern water purification means, the general population is at risk, and in particular infants and persons with compromised immune systems are at considerable risk.

In the U.S. and other developed countries, municipally treated water typically includes one or more of the following impurities: suspended solids, bacteria, parasites, viruses, organic matter, heavy metals, and chlorine. Breakdown and other problems with water treatment systems sometimes lead to incomplete removal of potential pathogens. For example, cryptosporidiasis, a type of waterborne microbiological contamination, was brought to national attention in April of 1993 when the water supply of the city of Milwaukee, Wis. became contaminated with *Cryptosporidium parvum* cysts resulting in 400,000 cases of the disease and over 100 related deaths.

In other countries there are deadly consequences associated with exposure to contaminated water, as some of them have increasing population densities, increasingly scarce water resources, and no water treatment utilities. It is common for sources of drinking water to be in close proximity to human and animal waste, such that microbiological contamination is a major health concern. As a result of waterborne microbiological contamination, an estimated six million people die each year, half of which are children under 5 years of age.

In the U.S., the National Sanitation Foundation (NSF), based on Environmental Protection Agency (EPA) studies, introduced standards that must be met for drinking water. The purpose of these standards is to establish minimum requirements regarding the performance of drinking water treatment systems that are designed to reduce specific health related contaminants in public or private water supplies. Established in 1997, Standard 53 requires that the effluent from a water supply source exhibit 99.95% removal of parasites against a challenge. Established in 1991, Standard 55 requires that the effluent from a water supply source exhibit 99.99% removal of viruses and 99.9999% removal of bacteria against a challenge. One microorganism for each class of pathogen is used to demonstrate that the filter system is adequately treating for the respective pathogens. As a representative microorganism for parasites/protozoa, *Cryptosporidium parvum* is used. Because of the prevalence of *Escherichia coli* (*E coli*, bacterium) in water supplies, and the risks associated with its consumption, this microorganism is typically used as the bacterium Also, MS-2 bacteriophage is typically used as the representative microorganism for virus removal because its size and shape (i.e., about 25 nm and spherical) make it a particularly difficult microorganism to be removed from liquids, relative to other viruses. Thus, a filter's ability to remove MS-2 bacteriophage demonstrates its ability to remove other viruses.

Therefore there is a need for a filter capable of simultaneously removing a broad spectrum of contaminants. This filter would comprise a single, small, lightweight, self-contained system rather than a complex multi-component and/or multistage system to remove the various contaminants. Such a filter would not only be more reliable than a complex system, but it would also be far more portable and economical. Thus, it could be utilized as a simple device on faucets in domestic settings where well water or water from a municipal source is used. In another application, such a device could be utilized in lesser developed regions of the world on a faucet or container for storing drinking water, where communal water sources are shared, but little is done to treat the water for contamination. A small, inexpensive, easy-to-use, water filter would be of great humanitarian and economic value. In certain applications, the filter should present a low resistance to the flow of water so that in locations where electricity necessary to drive a pump may be unavailable, the filter may simply be connected between upper and lower containers of water, or between the holding container and a drinking receptacle. In certain embodiments, the filter should also have sufficient structural integrity to withstand significant pressures if, for example, a source of pressure is available to drive the liquid through the filtering apparatus (e.g. mechanical pump, faucet pumped water, etc.).

Despite centuries of a well-recognized need and many development efforts, activated carbon in its various forms has never been shown to reliably remove pathogens from water or enjoyed wide-spread commercial use for pathogen removal per se. Many attempts have been made over the years to apply activated carbon to pathogen removal without notable success. In the U.S., the patent literature reflects that improved activated carbon materials and water treatment structures have been sought for water purification since at least the 1800's. For example, U.S. Pat. No. 29,560 (Belton, issued Aug. 14, 1860) teaches that an adsorptive carbon can be made by combining peat, cut out of the bog, with chalk in water to make a paste, followed by molding and firing. U.S. Pat. No. 286,370 (Baker, issued Oct. 9, 1883) teaches that artificial bone black blocks made from a slurry of finely powdered charred bones and magnesia can be used to good effect in water filters.

The prior art teaches away from using activated carbon alone, by teaching that a supplemental means must be used for pathogen removal, such as the use of biocides, pasteurization (heating), electricity, distillation or high-energy radiation such as UV or X-rays. Additionally, the U.S. EPA has taught against the use of activated carbon alone for pathogen removal, stating that "activated carbon [even] with silver does not eliminate all bacteria in water and cannot remove protozoa and viruses." (See 59 Federal Register 223, Nov. 21, 1994.) As an example of the use of separate pathogen removal means, U.S. Pat. No. 4,828,698 (Jewell et al., issued May 9, 1989) teaches the use of a microporous membrane having pore sizes from 0.02 $\mu$m to 0.5 $\mu$m for microbiological control. U.S. Pat. No. 4,576,929 (Shimazaki et al., issued Mar. 18, 1986); U.S. Pat. No. 5,705,269 (Leiberman, issued Jan. 6, 1998); and U.S. Pat. No. 5,607,595 (Hiasa et al., issued Mar. 4, 1997) teach the use of silver, organic pesticides, and periodic heating to supplement activated carbon use. U.S. Pat. No. 3,770,625 (Wallis et al., issued Nov. 6, 1973) teaches that viruses can be removed from a liquid using activated carbon forms (granular, powdered or pelleted) treated with a sodium containing hydrolyzing composition, such as sodium hydroxide, after an acid wash. The '625 patent further teaches that the method did not provide stand-alone treatment stating "it is frequently desirable to have filtration downstream of the activated charcoal to remove any sluffed-off adsorbing medium." U.S. Pat. No. 5,762,797 (Patrick et al., issued Jun. 9, 1998) discloses the use of a separate nonwoven, which is treated with an antibacterial material, to effect treatment of the bacteria. German Patent Publication No. 3,020,615 (Beauman et al., published Dec. 11, 1980) discloses the addition of silver-containing compounds to effect antibacterial activity. More recently, activated carbon fibers have been employed in water purification/filtration devices. See, e.g., U.S. Pat. No. 4,576,929 (Shimazaki, issued Mar. 18, 1986), U.S. Pat. No. 5,705,269 (Pimenov et al., issued Jan. 6, 1998), and European Patent No. EP 366,539B1 (Kaneko, published Mar. 25 1998). While these and other prior art references have previously utilized activated carbon, including activated carbon fibers, in water filters, it is evident that the activated carbon is being employed to remove organic matter. Thus, to the extent that certain prior art references disclose the use of activated carbon to treat a water source with respect to pathogen removal, including viruses, such approaches require the use of additional treatment steps or they require a relatively complex assembly of components.

Based on the foregoing, an object of the present invention is to provide an improved filter for removing contaminants from a fluid source, particularly a water source. A specific object includes providing a water filter comprising activated carbon fibers which removes a broad spectrum of contaminants, including very small microorganisms such as MS-2 bacteriophage to much larger pathogens such as *E coli* bacteria. The removal of such pathogens using the present filter is at a level not previously demonstrated by the prior art. Such a filter will preferably present a low resistance to the flow of liquid through the apparatus, and will remove the contaminants from a substantial volume of water before becoming saturated. In certain embodiments, the filter will also preferably be relatively portable.

Another object of the present invention is to provide a method of removing pathogens from fluids, particularly water, using the filters of the present invention.

Another object of the invention is to provide an article of manufacture comprising the filter of the present invention and information indicating that the filter may be used to remove pathogens, including viruses, from liquids.

Still another object of the present invention is to provide a process for preparing an activated carbon fiber composite (ACFC) that has high capacity for adsorption of pathogens.

Yet another object of the invention is to provide a filter constructed using activated carbon fibers that removes organic and some metal contaminants from a fluid stream with greater efficiency and effectiveness.

Still another object of the present invention is to provide an ACFC filter that may be utilized as a respirator filter for the removal of organic and other toxic vapors as well as airborne viruses and bacteria.

Yet another object of this invention is to provide an ACFC filter/absorber that may be utilized in removing contaminants such as organics, disinfection by-products, lead, chlorine, viruses and bacteria from drinking water at heretofore unattainable efficiency.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

SUMMARY OF THE INVENTION

The present invention relates to a filter comprising activated carbon fibers, wherein said filter has a Virus Removal Index (hereafter "VRI") of at least about 99%, as measured in accordance with the Test Method described in Section IX below.

In one aspect, the fibers of the filter are bound together by use of a binder to form an activated carbon fiber composite (ACFC). In a second aspect, the filters will comprise "free" activated carbon fibers, that is fibers that are not bound together via a binder.

The invention also relates to a method of removing viruses from a liquid, the method comprising the steps of contacting the liquid with a filter comprising activated carbon fibers wherein said filter has a VRI of at least about 99%. The invention further relates to an article of manufacture comprising:

(a) a filter comprising activated carbon fibers, wherein said filter has a VRI of at least about 99%; and (b) information that informs a user that the filter may be used to remove viruses from a liquid.

BRIEF DESCRIPTION OF THE DRAWINGS

The accompanying drawings, incorporated in and forming a part of the specification, illustrate several aspects of the present invention and together with the description serve to explain the principles of the invention. In the drawings.

Figure 1:
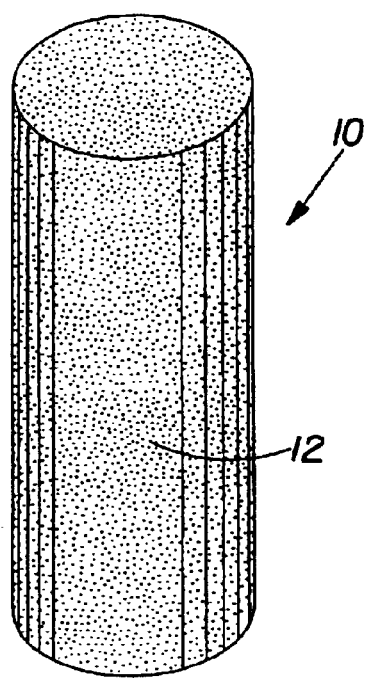
FIG. 1 is a perspective view of an ACFC filter useful either in removing contaminants including but not limited to organics, disinfection by-products, lead, chlorine, viruses, bacteria and *Cryptosporidium parvum* from drinking water or as a respirator filter for the removal of organic and toxic vapors as well as airborne viruses and bacteria.

Reference will now be made in detail to the present preferred embodiments of the invention, examples of which are illustrated in the accompanying drawings.

DETAILED DESCRIPTION OF THE INVENTION

I. Definitions

As used herein, an "activated carbon fiber" ("ACF") means activated carbon in a form having a relatively high aspect ratio, i.e., ratio of length to diameter. For purposes of the present discussion, activated carbon in a form where its aspect ratio is at least about 4:1 is a "fiber".

As used herein, an "activated carbon fiber composite" ("ACFC") means that activated carbon fibers are bound together via use of a binder. Such binders include resins, other polymers, pitches, epoxy resins, adhesives and coal powders, as well as others being well known in the art, in addition to phenolic resins. These binders can be introduced in a fluid medium as well as by solids mixing. Such an ACFC will be monolithic and thus may provide post-processing handling benefits relative to free fibers.

As used herein, a "filter" is any article of manufacture containing activated carbon fibers to enable their function in removing pathogens from liquid. Such a filter may be as simple as the fibers and an enclosure means to retain the fibers. When the filter comprises free fibers that are not bound together in the form a composite, it is apparent that such an enclosure must be capable of preventing loss of fibers during operation, as well as maintaining the desired inter-fiber network during use. Various representative embodiments for the filter of the present invention are described below.

As used herein, the terms "filters" and "filtration" refer to removal mechanisms, including those with respect to pathogen removal, via either or both of adsorption and size exclusion. Thus, these terms do not refer to mechanisms that merely "kill" pathogens (e.g., heating, chemical treatment and UV treatment). While the present filters provide surprising pathogen removal without the use of materials that kill the pathogens, it will be recognized that it may be desirable in certain circumstances to include, for example, chemical treatments that aid in purification of the liquid source.

As used herein, the term "free fibers" means that the individual ACFs are not bonded together by use of a binder. The avoidance of employing such a binder may facilitate production of the filter, in that there may be fewer processing steps and less energy consumption.

As used herein, the terms "liquid" and "water" are used interchangeably.

As used herein, the terms "microorganism", "microbiological organism" and "pathogen" are used interchangeably. These terms refer to various types of microorganisms that can be characterized as bacteria, viruses, parasites, protozoa, and germs.

Other terms used herein are defined in the specification where discussed.

II. Pathogen Removal Properties

The filters of the present invention comprise activated carbon fibers, wherein the filter is capable of removing from a liquid (preferably water) source at least 99% of viruses. That is, the filter has a Virus Removal Index (VRI) of at least 99%. Preferably, the filter will have a VRI of at least about 99.9%, more preferably at least about 99.99%, even more preferably at least about 99.999%, still more preferably at least about 99.9999%. Typically, the filters will have a VRI of from about 99.99% to about 99.9999%. In addition to this VRI capacity, the filters will also preferably be capable of removing at least about 99.9999% of bacteria; i.e., the filter will have a Bacteria Removal Index (BRI) of at least 99.9999%. Preferably, the filter will have a BRI of at least about 99.99999%, more preferably at least about 99.999999%. Typically, the filter will have a BRI of from about 99.9999% to about 99.999999%. Furthermore, the filter will preferably be capable of removing at least 99.9% of parasites/protozoa; i.e., the filter will have a Parasite Removal Index (PRI) of at least about 99.9%. Preferably, the filter will have a PRI of at least 99.99%, more preferably 99.999%. Typically, the filter will have a PR1 of from about 99.9% to about 99.999%.

The methods of the present invention relate to the use of a filter of the present invention to remove from a liquid (preferably water) source at least about 99% of viruses. Preferably, the method will remove at least about 99.9999% of bacteria and 99.9% of parasites. More preferably, the method will remove from a water source at least about 99.9%, more preferably at least about 99.99%, still more preferably at least about 99.999% of viruses, and most preferably at least about 99.9999% of viruses. Typically, the method will remove from about 99.99% to about 99.9999% of viruses from the water source.

The article of manufacture of the present invention comprises:

(a) a filter comprising activated carbon fibers, wherein said filter has a VRI of at least about 99% (preferably the VRI will be at least about 99.9%, more preferably at least about 99.99%, still more preferably at least about 99.999%, and most preferably at least about 99.9999%; and typically from about 99% to about 99.9999%); and (b) information that informs a user that the filter device may be used to remove pathogens, especially viruses, from a water source.

It is evident that the filter devices and methods of the present invention allow the treatment of water in excess of the standards set forth by the EPA in the U.S. In addition, applicants have found that the filters of the present invention may be used for long periods of time without becoming exhausted in terms of the ability to continue to remove pathogens from the source stream. The use of such filters therefore obviously would improve the health risk situation in many countries, based on the fact that the population in general would have less exposure to the various pathogens, particularly viruses. Perhaps more importantly, in those geographies where contamination of the source water is significantly worse than that observed in developed countries, the benefits provided by the present invention are magnified. For example, the ability to remove pathogens at such a high level for such a long period of usage (i.e., before they reach failure because of saturation with the various pathogens) allows for the purification, in terms of making water potable without undue health risk, of highly contaminated water.

III. Activated Carbon Fibers

Carbon fibers are produced commercially from rayon, phenolics, polyacrylonitrile (PAN), or pitch. The pitch type is further divided into fiber produced from isotropic pitch precursors, and those derived from pitch that has been pre-treated to introduce a high concentration of carbonaceous mesophase. High performance fibers, i.e. those with high strength or stiffness, are generally produced from PAN or mesophase pitches. Lower performance, general purpose fibers are produced from isotropic pitch precursors. The general purpose fibers are produced as short, blown fibers (rather than continuous filaments) from precursors such as ethylene cracker tar, coal-tar pitch, and petroleum pitch prepared from decant oils produced by fluidized catalytic cracking. Applications of isotropic fibers include: friction materials; reinforcements for engineering plastics; electrically conductive fillers for polymers; filter media; paper and panels; hybrid yards; and as a reinforcement for concrete.

More recently, interest has developed in activated forms of isotropic carbon fibers, where high surface areas can be produced by partial gasification in steam or other oxidizing gases. Activated carbon fibers have novel properties that make them more attractive than conventional forms (powders or large-size carbons) for certain applications. While porosity can be generated in most types of carbon fiber, low modulus fibers produced from isotropic pitch are particularly suited for activation because of their unique structure, where the random packing of small crystallites allows the development of an extensive pore structure.

Activated carbon fibers can be characterized by their length, diameter, porosity, specific surface area, and elemental composition. Length is meant to describe the distance from end to end of a fiber. The diameter refers to the mean diameter of a fiber. Porosity is characterized by the mean pore volume within the fiber. Specific surface area is a measure of the fiber surface area, including the area within the pores, per unit of mass of fiber. For the present invention, activated carbon fibers will preferably have: specific surface areas in a range of from about 100 to about 4000 m$^2$/g, more preferably from about 500 to about 3000 m$^2$/g, still more preferably about 1000 to about 2500 m$^2$/g; diameters in a range of from about 5 to about 50 µm, more preferably about 10 to about 25 µm, still more preferably about 15 to about 20 µm; and mean pore sizes from about 2.5 Å to about 300 nm, more preferably from about 5 Å to about 200 nm, still more preferably from about 10 Å to about 100 nm. The fibers can be solid or hollow. Activated carbon fibers have a narrow, sub-micron range of surface features not found in other activated carbon forms such as granules, powders, pellets, or other irregular shapes impregnated with carbon.

The manufacture of activated carbon fibers is described thoroughly in the literature and such fibers are available commercially from several sources. As discussed above, in general, carbonized fibers are made by carbonizing polyacrylonitrile (PAN), phenol resin, pitch, cellulose fiber or other fibrous carbon surfaces in an inert atmosphere. The raw materials from which the starting fibers are formed are varied, and include pitch prepared from residual oil from crude oil distillation, residual oil from naphtha cracking, ethylene bottom oil, liquefied coal oil or coal tar by treatment such as filtration purification, distillation, hydrogenation or catalytic cracking. The starting fibers may be formed by various methods, including melt spinning and melt blowing. Carbonization and activation provide fibers having higher surface areas. For example, activated carbon fibers produced from petroleum pitch are commercially available from Anshan East Asia Carbon Fibers Co., Inc. (Anshan, China) as Carboflex® pitch-based Activated Carbon Fiber materials, and Osaka Gas Chemicals Co., Ltd. (Osaka, Japan) as Renoves A® series-AD'ALL activated carbon fibers. The starting materials are a heavy petroleum fraction from catalytic to cracking and a coal tar pitch, respectively, both of which must be purified to remove fines, ash and other impurities. Pitch is produced by distillation, thermal cracking, solvent extraction or combined methods. Anshan's Carboflex® pitch-based activated carbon fiber materials are 20 µm in diameter with a specific surface area of about 1,000 m$^2$/g. They come in various lengths such as:

P-200 milled activated carbon fibers: 200 µm length

P-400 milled activated carbon fibers: 400 µm length

P-600 T milled activated carbon fibers: 600 µm length

P-3200 milled activated carbon fibers: 3.2 mm length

C-6 chopped activated carbon fibers: 6 mm length

Osaka Gas Chemicals' Renoves A® series-AD'ALL activated carbon fibers are 18 µm in diameter with various specific surface areas ranging from 1,000 to 2,500 m$^2$/g. They come in various lengths, including (the specific surface areas are noted parenthetically):

A-15-Milled AD'ALL activated carbon fibers: 700 µm length (1500 m$^2$/g)

A-20-Milled AD'ALL activated carbon fibers: 700 µm length (2000 m$^2$/g)

A-15-Chopped AD'ALL activated carbon fibers: 6 mm length (1500 m$^2$/g)

A-20-Chopped AD'ALL activated carbon fibers: 6 mm length (2000 m$^2$/g)

A-10-Random lengths AD'ALL activated carbon fiber: random lengths (1000 m$^2$/g)

A-15-Random lengths AD'ALL activated carbon: random length (1500 m$^2$/g)

A-20-Random lengths AD'ALL activated carbon: random length (2000 m$^2$/g)

A-25-Random lengths AD'ALL activated carbon: random length (2500 m$^2$/g)

IV. Physical Properties

While the present invention is directed in one respect to ACFCs and in a second respect to filters that comprise free ACFs, Applicants believe that certain physical properties common to both provide the surprising pathogen removal properties of the present invention. For example, bulk density is commonly used in the art to describe carbon containing structures. The filters of the present invention will have a bulk density of from about 0.15 to about 0.8 g/cm³, preferably from about 0.16 to about 0.6 g/cm³, still more preferably about 0.2 to about 0.4 g/cm³. In having calculated the bulk density and knowing the dimensions of the activated carbon fiber, one can determine the average interstitial spacing between fibers. It is discovered that interstitial spacing between fibers (also called inter-fiber spacing) is the critical parameter which controls the removal of microorganisms. Optimal interstitial spacing is achieved when the activated carbon fibers are compressed along the longitudinal or flow axis of the filter.

While not wishing to be bound by theory, Applicants believe that the surprising ability of the present filters to remove small pathogens, particularly viruses, is due to the: 1) inter-fiber spacing, that results from the packing of the activated carbon fibers, and the resulting flow mechanics conditions; and 2) fast adsorption kinetics and large adsorption capacity exhibited by the activated carbon fibers, when compared to granular or powder activated carbon. It is believed that the initial attachment of microorganisms, in particular bacteria and viruses, onto the activated carbon fibers is governed by the following interactions: 1) classical long-range colloidal (DLVO) and Lewis acid-base (AB); 2) short-range surface polymer and appendage; and 3) strong short-range (i.e., 0.1 to 0.2 nm).

The classical long-range DLVO colloidal forces include the electrostatic (EL) and van der Waals (vdW) dispersion, and depend on the surface characteristics of the microorganisms and fibers, and the distance between them. The electrostatic and vdW forces are applicable at separation distances above 2 nm. Below 2 nm, the AB forces (i.e., electron-donor/electron-acceptor interactions) are dominant. Note that the AB forces include the typical hydrophobic forces. The surface polymer interactions are based on the fact that the microorganisms contain polymers (e.g. lipopolysaccharides (LPS), extracellular polysaccharides (EPS), and surface proteins in Gram-negative bacteria; and proteins in viruses) and appendages (e.g. fimbriae in bacteria) in their outer shells. Finally, the strong short range forces are based on chemical bonds, such as covalent (i.e., strong bonds with a requirement of about 40 to 200 kT to break) and hydrogen bonds (i.e., weaker bonds with a requirement of about 4 to 16 kT to break).

Some of the above forces are attractive and the rest are repulsive. For example, the electrostatic forces are typically repulsive, since most of the surfaces are negatively charged (except for modified surfaces as well as some unmodified clay structures and asbestos). The vdW dispersion forces are typically attractive, whereas the AB forces can be either attractive or repulsive. Similarly, the surface polymer interactions can be either attractive, when the polymers have high affinity (i.e., adsorb) for the carbon fiber surface, or repulsive, when the surface polymers interact sterically with the carbon fiber surface.

According to the DLVO-AB model, adhesion of microorganisms onto carbon fiber surfaces is possible in an attractive primary (irreversible) or secondary (typically reversible) energy minimum. A typical secondary minimum occurs at separation distances on the order of 10 nm, and includes an energy well of about 5 kT.

The above described initial attachment is followed by subsequent steps that improve the attachment and are based on the excretion of various polymeric substances (e.g. extracellular polysaccharides-EPS) by bacteria during their metabolic cycle. This excretion is believed to cause strengthening of the attachment as well as an increase in the attachment sites for microorganisms that follow them.

Furthermore, fast adsorption of large quantity of nutrients by the activated carbon fibers facilitates the adsorption of microorganisms, as the latter are seeking nutrient-rich environments.

Figure 8:
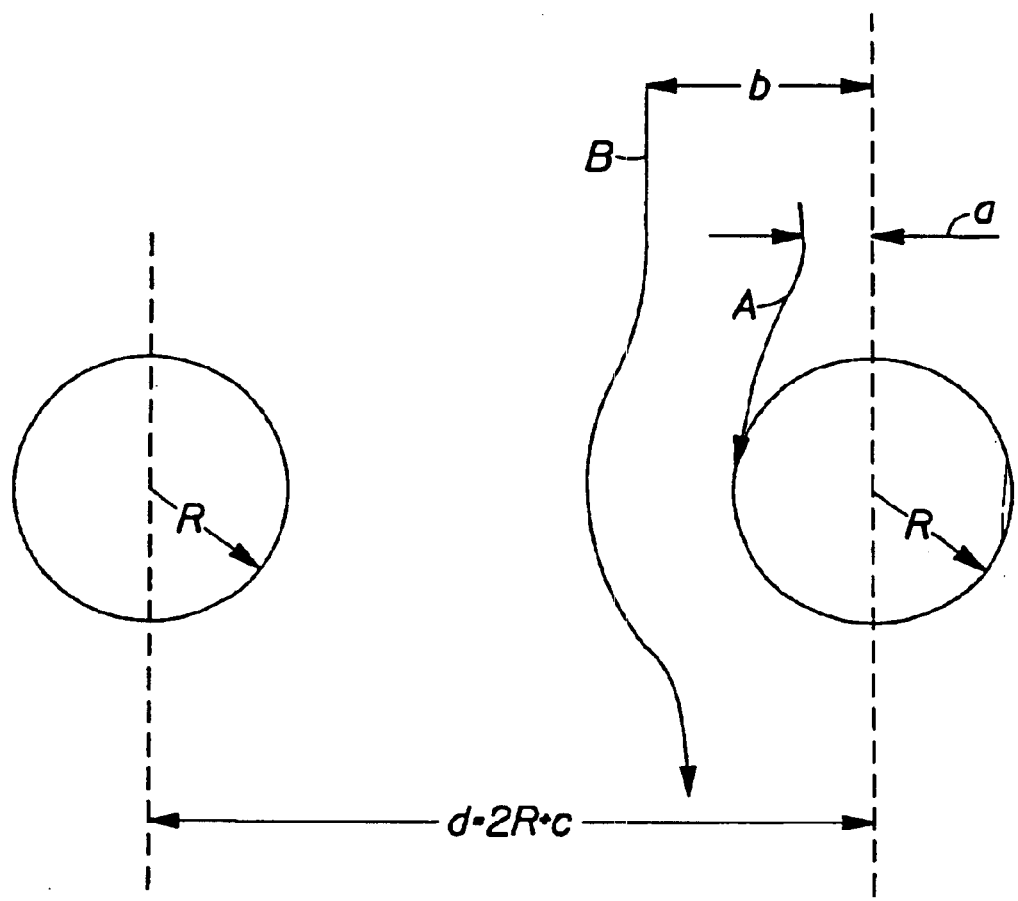
FIG. 8 is a cross sectional view of two activated carbon fibers of a filter of the present invention. Also depicted are the respective paths taken by two pathogens flowing through the filter.

In terms of the mechanics of the flow of pathogens in the filter, it is believed that the distance between two adjacent fibers, c, is critical in achieving attachment of pathogen to the fibers (see FIG. 8). In general, pathogens might flow close to the surface of a fiber so that the overall attractive force would cause them to attach to the surface (see pathogen A in FIG. 8). On the other hand, pathogens might flow far away from the fiber surface so that the overall attractive force cannot "pull" them towards the fiber surface for attachment (see pathogen B in FIG. 8).

In terms of the effect of the inter-fiber distance (also called spacing) on pathogen attachment onto the fiber surfaces, it is believed that there is an optimum range of inter-fiber distances that is necessary for pathogen attachment to fibers and removal from water. When this inter-fiber distance, c (see FIG. 8), is relatively large, then the majority of pathogens do not come close to the fiber surface for the forces mentioned above to cause attachment to the surfaces. As a result, the majority of pathogens do not get removed from the incoming water, and thus behave as pathogen B in FIG. 8. On the other hand, when this inter-fiber distance is relatively small, then the majority of pathogens come close to the surface of the fibers and experience the forces mentioned above. However, the shear conditions at these small gaps are high, and it is expected that where the inter-fiber distance is too small, the shear forces are high enough to overcome the attractive forces between pathogen and carbon surfaces. In these conditions there might be some pathogens that behave like pathogens A in FIG. 8 that do get attached to the fibers. However, it is expected that due to high shear forces these pathogens might experience dislodging at some later point in time. As a result, the majority of pathogens do not get removed from the incoming water. Therefore, there is an optimum range of inter-fiber spacing that strikes a balance between shear forces, attractive and repulsive forces. This balance ensures that pathogens get removed during their flow in the carbon fiber filters.

Finally, the fast adsorption kinetics and large adsorption capacity exhibited by the activated carbon fibers has been shown to exist for various chemicals, such as benzene, chlorine, toluene, acetates etc. However, it has not been shown before that such characteristics of the activated carbon fibers are applicable to microorganisms and in particular to viruses.

V. Filters Comprising Activated Carbon Fiber Composites (ACFC's)

As discussed above, the present invention is directed to filters comprising activated carbon fiber composites and free activated carbon fibers. The discussion in this Section V relates to the activated carbon fiber composites (ACFCs). In Section VI below, the free activated carbon fiber filters of the present invention are discussed in detail.

In the first aspect, the filter comprises an ACFC which is prepared in accordance with the methods set forth in co-pending U.S. patent application Ser. Nos. 08/747,109 and 08/935,631, the full disclosures of which are incorporated herein by reference. Other methods of preparing a bonded fiber composite are not to be excluded. For example, such binding methods include the use of resins, other polymers, pitches, epoxy resins, adhesives and coal powders, as well as others being well known in the art, in addition to phenolic resins. These binders can be introduced in a fluid medium as well as by solids mixing. Thus, in one embodiment, a selected carbon fiber is prepared to a given average length and is mixed in a water slurry with a carbonizable organic powder. The desired monolithic configuration is then molded from the slurry. The resulting green form is dried and removed from the mold. The composite is then cured and carbonized under an inert gas. Once carbonized, the composite is readily machined to the desired final dimensions. The composite material is then activated to develop the pore structure of the fibers before or after machining. Another option is to use pre-activated fibers and to form, cure and optionally carbonize and further optionally subject to mild secondary activation to produce the final product.

A carbon fiber composite filter of the present invention includes a composite of carbon fibers and binder having a cured density prior to activation of from about 0.1 to about 0.7 g/cm$^3$ and more preferably from about 0.36 to about 0.55 g/cm$^3$; an activated density following activation of from about 0.05 to about 0.55 g/cm$^3$ and more preferably from about 0.076 to about 0.495 g/cm$^3$; and a burnoff during activation of between 0 and about 90% and more preferably from about 21 to about 45%. It is also preferred that the ratio of cured density to activated density be from about 11.1 to 1 to about 4.7 to 1. Still more preferably, the composite has a void volume of from about 63 to about 95% and most preferably from about 71 to about 81%, as well as a mean inter-fiber spacing of from about 30 to about 302 μm and most preferably from about 42 to about 73 μm.

Still more specifically describing this aspect of the invention, the carbon fibers in the ACFC block are characterized by a micropore volume of from 0 to about 0.78 cc/g and more preferably from about 0.37 to about 0.51 cc/g; and a BET surface area of from 0 to about 1890 m$^2$/g and more preferably from about 600 to about 1500 m$^2$/g.

In accordance with yet another aspect, an apparatus for removing viral pathogens (e.g. polio virus and viruses transmitted in fecal material) includes an ACFC material capable of adsorbing from water at least about 2.0×10$^{11}$ plaque forming units (PFU) of model bacteriophage MS-2 per gram of carbon at a concentration of 2.67×10$^7$ PFU of bacteriophage MS-2/ml. Said filter may also be described as an ACFC that removes at least about 99.99% and more preferably at least about 99.9999% of model bacteriophage of MS-2 from drinking water loaded with up to 5;6×10$^7$ PFU of bacteriophage MS-2/ml when flowing through a column of substantially 1.0 in, diameter and 3.5 in, length at a flow rate of at least 7–67 column volumes per hour for at least twenty minutes. Thus, the filter provides at least 4 logs of removal of virus for up to 10 hours. When loading an influent containing 6.25×10$^8$ PFU/ml of MS-2, the carbon fiber composite can remove at least 99.9999% of MS-2 bacteriophage for at least 15 hours.

The ACFC containing filter of the present invention may also be defined by its novel and unique bacteria removal properties. Accordingly, the filter includes an ACFC that removes greater than about 99.99% and more preferably about 99.9999% of E. coli bacteria from drinking water loaded with up to 1.3×10$^6$ E. coli bacteria per ml when flowing through a column of substantially 1.0 in, diameter and 3.5 in, length at a flow rate of at least 8.3 column volumes per hour for one hour. In addition, the filter may be defined as including an activated carbon fiber composite that removes at least 99.999% of E. coli bacteria from drinking water loaded with up to 1.4×10$^6$ E. coli bacteria per ml when flowing through a column of substantially 1.0 in, diameter and 3.7 in, length at a flow rate of at least 65 column volumes per hour for 9.5 minutes. When challenged with an influent of E. coli of 6.2×10$^5$ of E. coli/ml the removal of E. coli is as high as 99.99999%.

E. coli is a standard bacterium used in testing of bacteria removal from water and was used for most of the testing of the ACFC containing filters. To illustrate that the removal data for E. coli translates to other bacteria, a test has been done for adsorption of the bacteria Aeromonas hydrophila. A. hydrophilia has been shown to be an opportunistic pathogen in immunocompromised hosts and it has also been demonstrated to cause enteritis in normal hosts. The symptoms caused by A. hydrophilia include vomiting and diarrhea. It is found widely in fresh and brackish waters and is usually transmitted through drinking contaminated water. The experiment described in the next paragraph demonstrates that the ACFC containing filters' capacity for removal of A. hydrophilia is better or equal to their removal of E. coli. It was established that the activated carbon fiber composite can remove at least 99.99999% of A. hydrophilia when 750 ml of solution loaded with 2.44×10$^8$ colony forming units (CFU) of A. hydrophilia per ml was passed through a 2 in. long cylindrical filter comprised of an ACFC (see Example 22).

Still other objects of this aspect of the invention will become apparent to those skilled in this art from the following description wherein there is shown and described a preferred embodiment of this invention, simply by way of illustration of one of the modes best suited to carry out the invention. As it will be realized, this aspect of the invention is capable of other different embodiments and its several details are capable of modification in various, obvious aspects all without departing from this aspect of the invention. Accordingly, the descriptions will be regarded as illustrative in nature and not as restrictive.

A novel method is hereby provided for making an ACFC material having a rigid, open, monolithic structure with high permeability. Further, the processing method allows the control of the composite's overall porosity.

The ACFC of the present invention is comprised generally of carbon fibers and a binder. The composite is strong and permeable, allowing fluids to easily flow through the material. At the same time, when activated, the carbon fibers provide a porous structure for adsorption.

Synthesis of the carbon fiber composite generally comprises mixing a selected carbon fiber and a binder, for example a carbonizable organic powder such as a phenolic resin, with water to form a slurry. The desired monolith configuration is molded from this slurry. The resulting green form is dried and removed from the mold. The composite is cured prior to carbonization under an inert gas. The composite material is then activated to develop the pore structure of the fibers. Alternatively, carbonization and activation may be completed in a single step. The composite may be readily machined to the desired final configuration either before or after activation. And composites can be made from pre-activated fibers, so that no or less activation may be necessary after forming.

In one embodiment of this aspect of the present invention, an isotropic pitch precursor is formed such that the resultant fibers define a diameter of approximately 10–25 μm. The fibers can be in a stabilized or carbonized condition and are cut to an average length of approximately 200 μm, but can range from 100–1000 μm. The chopped fibers are then mixed in a water slurry with a binder such as a phenolic resin. The binder can also be any binder known in the art such as a thermosetting resin adhesive, pitch, or other binders and adhesives known in the art.

In a preferred forming method the slurry is transferred to a molding tank of any cross section (circular, to make cylinders or blocks or annular to make tubes). The mold has a screen at the bottom. The slurry is filtered through this screen by applying an overpressure of air or applying a vacuum on the drainage side of the screen. In most cases, an acceptable rate of filtration is achieved by relying upon the hydraulic head of slurry. Of course, other molding methods can be utilized (e.g. pressure forming or any of the other various forming methods practiced in the plastics industry).

The resulting green form is partially dried, preferably in air at approximately 50° C. The form is then removed from the mold and the green form is cured (at e.g. 130° C. in air) to produce a cured monolithic body. The resulting composite is then carbonized under an inert gas. Preferably, carbonization is conducted for up to three hours under nitrogen at 650° C. to pyrolize the resin binder.

The composite formed by the above process defines voids or interstitial space between the fibers which allow free flow of fluid through the material and ready access to the carbon fiber surface. Further, the individual carbon fibers are held in place by the pyrolyzed resin binder and thus cannot move or settle due to the flow of gases/liquids through the material. The carbonized bulk or cured density of the composite material is typically between substantially 0.1 to 0.7 $g/cm^3$ and more preferably substantially between 0.36 and 0.55 $g/cm^3$.

Following its manufacture, the monolithic carbon fiber composite is activated. Activation of the carbon fibers is accomplished by reaction with steam, carbon dioxide or by chemical activation. The resulting chemical reactions remove carbon and develop pores in the carbon fibers, which are classified by diameter, micropores (less then 2 nm), mesopores (2–50 nm) and macropores (greater than 50 nm).

In the preferred embodiment, the composite is steam activated in a steam/nitrogen atmosphere. The preferred activation conditions are: 800–950° C., steam at a partial pressure of about 0.1–0.9 atmospheres and for durations of about 1–3 hours. Burnoff is calculated from the initial and final weights. For the present invention, approximately 0–90% and more preferably about 21–45% burnoff is performed to provide a composite with good virus, bacteria and cyst (parasite) removal characteristics in addition to a high capacity for the adsorption of other waterborne contaminants. Specifically, the resultant fibers in the composite define a micropore volume of preferably substantially 0.37–0.51 cc/g, a low mesopore volume and no macropores. The voids, or interstitial spaces, that are present in the composite provide free access to the fiber pores, thereby producing a synergistic beneficial effect leading to enhanced adsorption capacity and efficiency. The carbonized and activated composite has a density of between substantially 0.05–0.55 $g/cm^3$ and more preferably about 0.076–0.495 $gtcm^3$.

The activation conditions can be varied by changing the activation gas, its concentration, the flow rate, the temperature, the furnace configuration and the optional presence of a catalyst to influence total surface area and pore size distribution. Further, the use of post activation treatments can be implemented. For example, further heating in a controlled gas atmosphere or the introduction of chemicals could affect the pore size distribution and surface chemistry. Once carbonized or activated the composite can be machined to any desired shape, forming a monolithic carbon fiber composite.

In accordance with another embodiment of this aspect of the present invention, one part by weight of carbon fibers having a diameter between 5 and 100 μm and a length between 0.1 and 0.4 mm; between 0.05 and 1 and more preferably between 0.2 and 0.5 part by weight powdered binder (e.g., one-step phenolic resin, two-step phenolic resin, pitch, other thermosetting resins, coal extracts, coals that soften); and 5–50 parts by weight water are mixed in order to create a slurry. Such a slurry has between 5–50 cc of water per gram of carbon fibers. For example, for carbon fibers 700 μm in length and 17 μm in diameter, between 8–10 L of water per kilogram of fibers may be used. For shorter or fatter fibers, less water is needed. Advantageously, a relatively low concentration of water reduces the forming time of the green monolith thereby speeding production. Further, it reduces the tendency of the carbon fibers to layer, thereby producing a more random or isotropic composite material with enhanced physical characteristics. These include, but are not limited to, the ability to better withstand stress during heat treatment and activation and also a reduced tendency to delaminate.

The mixing is completed in a mixing tank. In the mixing tank, the binder and the fibers are added into a vortex formed by an agitator. Preferably, the binder is first mixed with a minimum amount of water to a thick paste to ensure good homogeneity. The total amount of water used determines the anisotropy of the final composite. For minimal anisotropy the amount of water used should only be just above the minimum practical amount to produce a pourable or pumpable slurry. For maximum anisotropy, the amount of water used may be approximately that required to give a concentration of 2 weight percent fiber in water.

The slurry is transferred to a molding vessel soon after it is made. The molding vessel can be of virtually any cross section (e.g. circular to make rods or blocks, annular to make tubes). The mold has a screen of stainless steel or other rigid material clamped at its bottom. The slurry can be filtered through this screen by applying an overpressure of air or a vacuum to its underside. In most cases, an adequate rate of filtration is achieved merely by relying upon the hydraulic head of the slurry.

The resulting green form is dewatered. In a preferred embodiment, this is partially achieved by passing air through the form. Once dewatered by about 50% by weight, the form is removed from the mold. This is accomplished by unclamping the filter screen and applying a small pressure (e.g. 5 psi) either mechanically or pneumatically. This is often best done by horizontal displacement to avoid distortion of the relatively weak green composite. The green form is then dried and cured to produce a cured monolith. The drying and curing is completed in an oven to a temperature dependent upon the binder in use (e.g. to at least 150° C. in air for phenolic resins; 500° C. in nitrogen for coal). It should be appreciated that the rate of heat transfer to the composite controls the time for drying and curing, but temperatures above 300° C. must not be used in air if burning of the fibers is to be avoided. Typically, small specimens may be heated to 200° C. at 5° C./min. The composite is then carbonized and activated by heating it typically to 850° C. for one hour in an atmosphere of 50% steam and 50% nitrogen or at 950° C. in carbon dioxide. Other known means of activation may also be utilized.

Activation conditions can be varied by changing the activation gas, its concentration, the flow rate, the temperature, the physical configuration of the furnace, the gas flow distribution and the optional presence of a catalyst to influence total surface area and pore size distribution. Further, the use of post activation treatments can be implemented. For example, further heating in a controlled atmosphere or the introduction of chemicals could affect the pore size distribution and surface chemistry. Once carbonized or activated, the composite can be machined to any desired shape. In this way it is possible to form a monolithic carbon fiber composite filter capable of fitting the available space in any existing purification system.

In accordance with an important aspect of the present invention, the composite formed by the above processes includes voids, or interstitial spaces, between the fibers which allow free flow of fluid through the material and ready access to the carbon fiber surface. Further, the individual carbon fibers are held in place by the pyrolyzed resin binder and thus cannot move or settle due to the flow of gases or liquids through the material.

The ACFCs preferably include a void volume between substantially 63.2–94.7% and most preferably between substantially 70.9–81.1%. Void volume is determined by the equation:

$$V_o=1-V_f$$

where
  $V_o$=composite void volume
  $V_f$=volume fraction of fibers in composite and where
  $\rho_c$=cured density of composite
  $V_2$=unit volume of composite
  $\rho_f$=density of fiber=1.9 g/cm³.
This allows derivation of the following:

$$V_f=(\rho_c*V_c)/\rho_f$$

$$V_o=V_c-V_f=V_c-(\rho_c*V_c)/\rho_f$$

$$V_o/V_c=1-\rho_c/\rho_f$$

In addition, the carbon fiber composites also preferably include a mean inter-fiber spacing of between about 30.3–302 μm and more preferably between about 42.4 and 73.1 μm. This parameter indicates on average how far apart the fibers are in the composite and, therefore, how wide the interstitial spaces are between the fibers.

The inter-fiber spacing is derived by assuming that the composite has a model cubic structure: that is, the most dense configuration that may be achieved in an isotropic fiber composite. Fiber spacing a is set to be the distance between the centers of two closest fibers (see FIG. 1a). Fiber radius r is an average of 15 microns for, for example, pitch based carbon fibers. By considering one unit cell of dimension a x a x a, the following equations are derived for inter-fiber spacing $S_f$. Where
  $V_f$=volume fraction of fibers in unit cell
  $V_c$=volume of unit cell of carbon fiber composite
  $\rho_c$=density of unit cell of carbon fiber composite
  $\rho_f$=density of carbon fibers=1.9 g/cm³
There are twelve fibers along the periphery of the unit cell. However, only ¼ of the volume of each fiber is included in the unit cell. Thus, the volume of fiber in a unit cell is 12* (¼) aπr²=3 aπr².

The volume of fibers in a unit volume of composite is $V_{fc}=(V_c*\rho_c)/\rho_f$. Hence 3 aπr²=$(V_c*\rho_c)/\rho_f=(a^3*\rho_c)/\rho_f$ from which $a^2=(3a\pi r^2\rho_f)/\rho_c$ and $a=((3a\pi r^2\ \rho_f)/\rho_c)^2$. Thus, the inter-fiber spacing $S_f$ is $$S=a-2r=a-15\ \mu m.$$

The last two equations allow the calculation of average inter-fiber spacing at a given composite density, assuming a cubic packing of fibers.

Figure 1A:
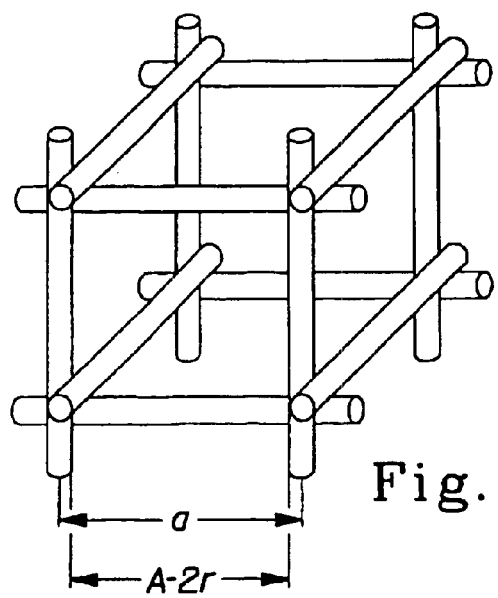
FIG. 1a is a schematic of a composite filter illustrating the derivation of the inter-fiber spacing value for the composite.

Reference is now made to FIG. 1 showing an ACFC filter 10 constructed in accordance with the previously described method. As shown, the ACFC filter 10 includes a cylindrical body 12 of bonded activated carbon fibers. It should be appreciated, however, that the composite filter 10 may be formed in substantially any polygonal shape or other foreseeable configuration desired for the particular application for which the filter will be used.

Figure 2:
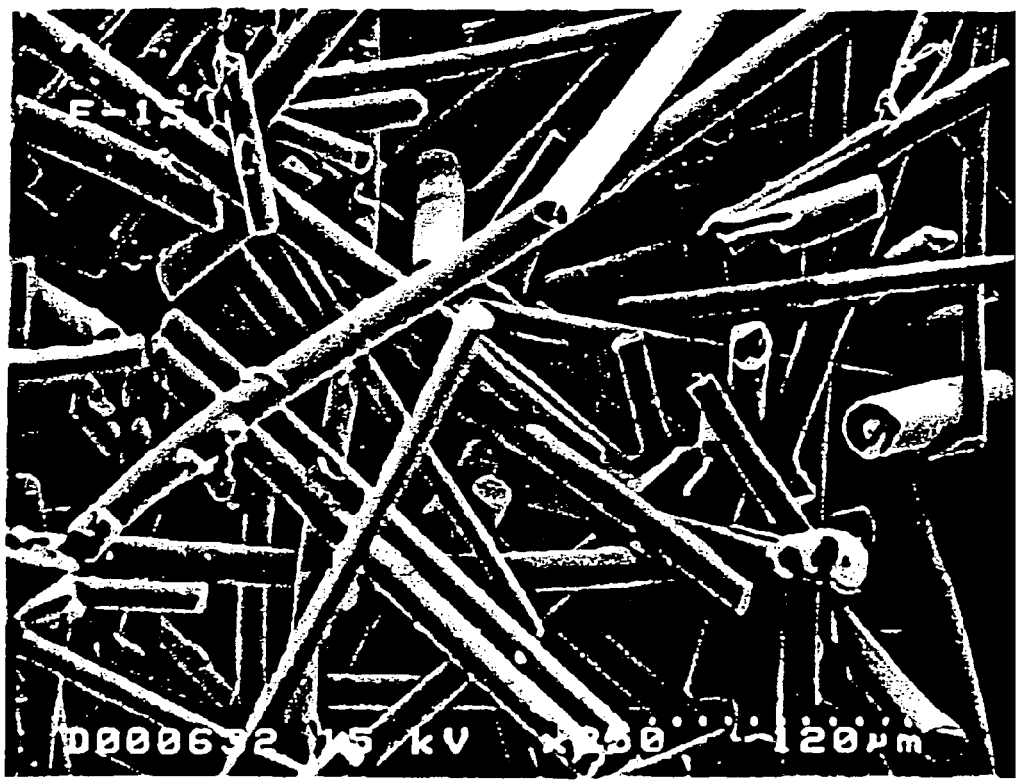
FIG. 2 is an electron micrograph of the filter of the present invention showing the activated carbon fibers and interstices.

As indicated, the ACFs by definition have an aspect ratio of at least 4:1. Preferably, the activated carbon fibers utilized in the filter 10 have an aspect ratio of at least 10:1 and still more preferably at least 20:1 and are subject to approximately up to 90% burn-off and more preferably between substantially 21–45% burnoff upon activation. The block also has a cured density after carbonization but before activation of between substantially 0.1–0.7 g/cm³ and more preferably between substantially 0.36–0.55 g/cm³. Following activation, the composite has an activated density of between substantially 0.05–0.55 g/cm³ and more preferably between substantially 0.076–0.495 g/cm³. As a result, the filter 10 is characterized by an extremely open structure (note, electron micrograph in FIG. 2). In fact, the filter 10 has a ratio of interstitial area to activated carbon fiber area in cross section of between substantially 3 to 1 to 20 to 1. The result is a porous filter 10 replete with extensive tortuous pathways running through its body. Viruses, bacteria, organics and other contaminants at low concentration must follow these pathways. Generally, bacteria are larger than the pores in the activated carbon and it is the open structure (i.e. large interstices/pathways) of the present invention that allow entry of the bacteria inside the composite allowing access to the surfaces of the activated carbon fibers that define the boundaries of those interstices/pathways on which the bacteria are effectively trapped.

It should also be appreciated that the binder only binds the fibers at the intersections of one fiber with another. Accordingly, most of each fiber's surface pores are maintained accessible for adsorption of organics, viruses and other contaminants. While the viruses are also generally too large to become entrapped in the pores, they do become entrapped on the extensive external carbon fiber surfaces that define the tortuous pathways characteristic of the composite structure. Accordingly, the filtering efficiency provided by the activated carbon fiber composite filter 10 of the present invention is significantly enhanced over any activated carbon filter heretofore available in the art.

It should be appreciated that the present invention comprises a method of removing contaminants from a fluid stream whether that fluid stream is an air stream or a liquid stream such as water. In one aspect, the method comprises the step of passing the fluid stream through an ACFC filter wherein the ACFC consists of fibers with an aspect ratio of at least 4:1, the fibers have undergone a burnoff of up to 90% and more preferably between substantially 21–45% during activation; and the filter has a cured density of between substantially 0.1–0.7 g/cm³ and more preferably 0.36–0.55 g/cm³ after carbonization but before activation and an activated density of between substantially 0.05–0.55 g/cm³ and more preferably 0.076–0.495 g/cm³ following activation.

Advantageously, since the carbon fibers are rigidly bonded in a composite monolithic body there is no movement within the adsorbent bed such as might occur in a bed of granular carbon. Since movement often results in attrition and the production of carbon fines that may pass through the bed and carry contaminants, the elimination of this movement is a significant benefit. Further, movement can result in channeling that gives inefficient adsorption. Avoidance of this problem is also a significant benefit of this aspect of the present invention.

The following examples further illustrate the ACFC aspect of the invention, but it is not to be considered as limited thereto. The protocol used for testing MS-2 bacteriaphage and *E. coli* bacteria adsorption from water in these examples includes:

1.) Connecting sterile, size 15, thick-walled Phar-Med tubing, using screw clamps, to influent and effluent ports of filter.
2.) Connecting sterile, size 16 Phar-Med tubing to the influent port of the filter using tabling adapters.
3.) Arranging the filter in an upflow configuration and securing to a burette clamp.
4.) Feeding size 16 tubing through pump heads and securing to pumping motor.
5.) Connecting size 16 tubing to a source of sterile liquid matrix.
6.) Setting desired pumping rate.
7.) Turning on pump.
8.) Checking flow rate.
9.) Pumping a volume of sterile liquid matrix through the filter that is a minimum of five times the volume of the filter.
10.) Turning off pump.
11.) Inoculating a second portion of *sterile liquid matrix with virus or bacteria that will produce a final concentration of $10^7$ to $10^5$ organisms respectively.
12.) Disconnecting size 16 tubing from sterile liquid matrix used to wash the filter and connecting it to the matrix containing virus or bacterium. (If testing for bacteria, continuing to mix bacteria using a sterile magnetic stir bar for the entire run.)
13.) Turning on pump.
14.) Directly sampling the inoculated liquid matrix and placing into a sterile collection vesicle. This is a control. (If the flow rate or length of filtration requires refreshment of the virus/bacteria matrix, a final control must be taken for the old matrix and a beginning control must be taken for the new matrix. Repeat this process for all refreshment of matrixes throughout the experiment.)
15.) Collecting samples in sterile collection vesicles from effluent port of filter. (Sample collection method and time of collection changes as flow rate changes. For higher flow rates, samples were taken from a collection port using a sterile syringe and were taken more often. At lower flow rates, samples were taken directly from the end of the effluent hose and taken at greater time intervals.)
16.) Continuing to collect effluent samples until the desire time of filtration is complete.
17.) Taking final control sample.
18.) Turning off pump.
19.) Serial diluting all samples in pre-made dilution tubes containing 4.5 ml of 1X nutrient broth. If the samples are not going to be immediately processed 2X nutrient broth should be used.
20.) After serial dilutions have been completed the samples should be plated using either a double layer agar assay (virus) or pour plate assay (bacteria). Amounts of sample plated are stated in the method protocols.
21.) Plating samples in duplicate to achieve an average count for virus or bacteria.
22.) Incubating plates at 37° C. for the periods stated in the method protocols.
23.) After incubation, removing plates from the incubator and counting those that appear to have between 25–300 PFU per plate, on a back lit plate counter. Bacteria (in CFU) counting are done in the same manner.
24.) Recording the number of virus or bacteria counted and the dilution factor at which they were counted.
25.) Averaging the plate counts and multiplying them by their corresponding dilution factor and dividing by the amount of dilution used per plate. This calculation gives the amount of virus or bacteria in the original sample.

| Plate 1 | Plate 2 | Avg. plate | Dilution factor | dil. per plate | PFU/ml |
|---|---|---|---|---|---|
| 25 | 25 | 25 | 10E + 03 | 0.2 | 1.3E + 05 |

Sample calculation (virus)=((avg. plate *dilution factor)/dil. per plate)=PFU/ml in original sample 25. Take the log (sample/control) to calculate logs of virus or bacteria removed from the filtrate by the filter or ((control-sample)/control)*100 for percent removal.

Examples 1 through 9 relate to adsorption of MS-2 bacteriophage.

Example 1

The column was cut from a large block of carbon fiber composite OR 190. The production method for this block, which gives a layered composite, involves mixing of Anshan's Carboflex® P200T pitch-based activated carbon fiber (R303T) with water and Durez 7716-2-step phenolic resin (OxyChem) in a weight ratio of resin to fiber of 1:4 in a dilute slurry (slurry concentration about 15%). After mixing, part of the slurry was poured into a mold while the water was drawn through a filter at the base of the mold by vacuum, and the fiber-resin mixture adapts to the mold shape. The remainder of the slurry was added in increments, providing sufficient times for water drainage. After the last part of the slurry was added, vacuum was applied for 40 minutes to draw the remaining water through the cake and effect partial drying. The composite was then ejected from the mold, and dried and cured at 200° C., and carbonized at 650° C.

The carbonized composite was then activated in steam at 877° C. for 2 hours at a nitrogen flow rate of 2 L/min. and a water flow rate of 153 cc/hour. The burnoff was 19%, and the total carbonization and activation yield loss was 28%. The average BET surface area of the material was 800 m²/g. The density of the activated material was 0.33 g/cc.

A column was cut from the composite block using a drill press fitted with a 1 in. diameter core extractor. Five pieces of the material, all about 2–¾ in. long were stacked together in a column to make up a total length of 3.0 in. with a column weight of 12.81 g.

Column breakthrough studies were conducted to compare the ACFC of the present invention to a column packed with commercially available granular activated carbon (GAC) Calgon F400 (Calgot Carbon Corp., Pittsburgh, Pa.). The carbon adsorptive capacities were evaluated for a model bacteriophage, MS-2. Virus removal was markedly more efficient on a weight basis for ACFC than for the GAC (see FIG. 3). The Calgon F 40 column was packed with 30×40 mesh GAC, while the ACFC column was composed of molded disks of composite stacked upon each other. The inlet concentration of virus to the GAC column was 2.82×$10^6$ PFU/ml, while the inlet concentration to the ACFC column was increased approximately ten times to 2.67×$10^7$ PFU/ml. The ACFC column clearly outperfomed the GAC column. A conservative value of 10% of the average initial concentration was chosen as the breakthrough point. The GAC reached breakthrough after about 11.7 hours, while the ACFC reached breakthrough after about 25.8 hours. The amount of virus adsorbed per gram of carbon was 6.69×$10^8$ PFU and 1.39×$10^{10}$ PFU for F-400 and ACFC, respectively.

To summarize in more detail the adsorption results for the ACFC filter of the present invention, the sample was tested for MS-2 bacteriophage removal at a flow rate of 259 ml/hr (6.66 column volumes/hr) of water spiked with 2.67×$10^7$ PFU/ml of MS-2. The removal of MS-2 was better than 3 logs (99.98%) for the first 24 hours, and 2 logs (99.62%) until 29 hours. Detailed results of the column studies are shown in Table 1 (column #1) and as a log removal in Table 2 (column #1). The results for granular activated carbon (GAC) filter are shown as prior art in Tables 1 and 2.

Example 2

The column #2 was cut from a large block of carbon fiber composite OR 190. The production method for this block gives a layered composite and was identical to the procedure used to produce column #1 in Example 1.

The carbonized composite was then activated in steam at 877° C. for 2 hours at a nitrogen flow rate of 2 L/min. and a water flow rate of 153 cc/hour. The burnoff was 19%, and the total carbonization and activation yield loss was 28%. The average BET surface area of the material was 800 $m^2/g$. The density of the activated material was 0.32 g/cc.

A column was cut from the blocks using a drill press fitted with a 1 in. diameter core extractor. The length of the core was 3.5 in., the outside diameter was 0.91 in. and the weight was 11.81 g.

The sample was tested for MS-2 bacteriophage adsorption at a flow rate of 300 ml/hr (8.12 column volumes/hr) of water spiked with 3.0×$10^7$ PFU/ml. The removal of MS-2 was better than 5 logs (99.999%) for 3 hours, 4 logs (99.99%) in the $4^{th}$ hour, and 3 logs (99.92%) in the $5^{th}$ hour. Detailed results of virus adsorption tests are shown in Tables 1 and 2 (note column #2).

Example 3

The column #3 to be tested was cut from three different blocks of carbon fiber composites OR 193, 198 and 210. The production method for these blocks, which gives layered composites, involves mixing P200 pitch-based carbon fibers (R303T) with water and Durez 7716 2-step phenolic resin in a weight ratio of resin to fiber of 1:4 in a dilute slurry (slurry concentration about 15%). After mixing part of the slurry was poured in a mold shape. The remainder of the slurry was added in increments, providing sufficient times for water drainage. After the last part of the slurry was added, vacuum was applied for 40 minutes to draw the remaining water through the cake and effect partial drying. The composites were then ejected from the mold, dried and cured at 200° C., and carbonized at 650° C.

The composites were then activated in steam at 877° C. for 1.5 hours at a nitrogen flow rate of 2 L/min. and a water flow rate of 100 cc/hour. The overall burnoff for the three samples was 29.5, 30.5 and 19.4%. Total carbonization and activation yield losses were 37.5, 38.5 and 28.4%. The BET surface area of the material was 603–620 $m^2/g$.

A column was cut from the blocks using a drill press fitted with a 1 in. diameter core extractor. The length of the core was 2.70 in., the outside diameter was 0.91 in. and the weight was 6.75 g. The density of material was 0.237 g/cc.

The sample was tested for MS-2 bacteriophage adsorption at a flow rate of 300 ml/hr (8.12 column volumes/hr) of water spiked with 8.0×$10^6$ PFU/ml of MS-2. The removal of MS-2 was better than 3 logs (99.95%) for 6 hours, and 2 logs (99.72%) in the $7^{th}$ hour. Detailed results of the virus adsorption tests are shown in Table 1 and 2 (note column #3).

Example 4

The column #4 to be tested was cut from a 4 in. diameter cylindrical block of carbon fiber composite F912. The production method for F912 which gives a layered composite was as follows. Three hundred grams of P200 pitch-based carbon fibers (R303T) were mixed with 1500 cc of water, and 75 g of Durez 7716 2-step phenolic resin was added to the mixture. After mixing for 5 minutes, 400 cc of slurry was poured in a 4 in. diameter cylindrical mold and allowed to settle for 1 min. while water was filtered off before more slurry is poured in increments of 200 cc. Each increment is allowed to settle for 1 min. before adding the next. After the last 200 cc was added, vacuum was applied for 40 min. to draw the remaining water through the cake and effect partial drying. The composite was then ejected from the mold, and dried and cured at 200° C. for 5 hours.

The cured composite was then activated in steam at 877° C. for 4.5 hours at a nitrogen flow rate of 2 L/min. and a water flow rate of 100 cc/hour. The bumoff was 28.1%. The BET surface area of the material was 895 $m^2/g$.

A column was cut from the block using a drill press fitted with a 1 in. diameter core extractor. The length of the core was 3.65 in., the outside diameter was 0.91 in. and the weight was 14.6 g. The density of material was 0.375 g/cc.

The sample was tested for MS-2 bacteriophage adsorption at a flow rate of 330 ml/hr (8.02 column columns/hr) of water spiked with 8.2×$10^6$ PFU/nml of MS-2. The removal of MS-2 was better than 4 logs (99.994%) for 5 hours, and 2 logs (99.79%) in the $6^{th}$ hour. Detailed results of virus adsorption tests are shown in Tables 1 and 2 (note column #4).

Example 5

This column #5 was made from the same block of material as column #4. After activation, the burnoff of the material was 28.1%. The BET surface area of the material was 895 $m^2/g$.

A column was cut from the block using a drill press fitted with a 1 in. diameter core extractor. The length of the core was 3.71 in., the outside diameter was 0.91 in. and the weight was 14.8 g.

The sample was tested for MS-2 bacteriophage adsorption at a flow rate of 330 ml/hr (8.35 column volumes/hr) of water spiked with 8.2×$10^6$ PFU/ml of MS-2. The removal of MS-2 was better than 4 logs (99.9994%) for 2 hours, better than 4 logs (99.996) for the $3^{rd}$ hour, and two logs (99.89%) for the fourth hour. Detailed results of virus adsorption tests are shown in Tables 1 and 2 (note column #5).

Example 6

The column # 6 to be tested was cut from a 4 in. diameter cylindrical block of carbon fiber composite F920. The production method of F920 which gives an unlayered composite was as follows. Three hundred grams of P200 pitch-based carbon fibers (R303T) were mixed with 3000 cc of water and 75 g of Durez 7716 2-step phenolic resin. After mixing for 5 minutes, the slurry was poured into a 4 in. diameter cylindrical mold. The mixture was allowed to settle for 10 seconds before applying a vacuum for 20 min. The composite was ejected from the mold, and cured at 200° C. for 3 hours. The difference between this material and the ones described previously is that this one is made by pouring all the mixture in the mold simultaneously, not in increments, giving less time for the fibers to settle and creating a composite that is not layered.

The cured composite was then activated in steam at 877° C. for 4.5 hours at a nitrogen flow rate of 2 L/min. and a water flow rate of 100 cc/hr in run # RTSA-58. The burnoff was 25.2%. The BET surface area of the material was 550 $m^2/g$.

A column was cut from the block using a drill press fitted with a 1 in. diameter core extractor. The length of the core was 3.50 in., the outside diameter was 0.907 in. The density of material was 0.431 $g/c^3$.

The sample was tested for MS-2 bacteriophage adsorption at a flow rate of 330 ml/hr (8.91 column volumes/hr) of water spiked with $1.4 \times 10^7$ PFU/ml of MS-2. The removal of MS-2 was better than 5 logs (99.999%) for 9 hours, two logs (99.997%) in the tenth hour. Detailed results of virus adsorption tests are shown in Tables 1 and 2 (note column #6).

Example 7

This column #7 was made from the same material as column # 6. The method of making is identical. The burnoff was 25.2%. The BET surface area of the material was 550 $m^2/g$.

A column was cut from the block using a drill press fitted with a 1 in. diameter core extractor. The length of the core was 3.538 in. and the outside diameter was 0.907 in. The density of the material is 0.417 $g/cm^3$.

The sample was tested for MS-2 bacteriophage adsorption at a flow rate of 330 ml/hr (8.88 column volumes/hr) of water spiked with $1.4 \times 10^7$ PFU/ml of MS-2. The removal of MS-2 was better than 5 logs (99.9998%) for 10 hours. Detailed results of virus adsorption tests are shown in Tables 1 and 2 (noted column #7).

Example 8

The production method for this material which was made directly as a 1 in. diameter, 4 in. long column involved mixing 28 g of P200 pitch-based carbon fibers (R303T) with 120 cc of water and 7 g of Durez 2-step phenolic resin. After mixing, the slurry was poured into a mold made from a 1 in. ID PVC tube, where the fiber-resin mixture adapts to the mold shape. The mixture was allowed to settle for 10 seconds before applying a vacuum for 1 min. to draw the remaining water through the cake and effect partial drying. The composite was ejected from the mold, and cured at 200° C. for 3 hours.

The cured composite was then activated in steam at 877° C. for 3.5 hours at a nitrogen flow rate of 2 L/min. and a water flow rate of 100 cc/hour. The burnoff was 28.6%. The BET surface area of the material was 905 $m^2/g$. The density of material was 0.427 g/cc.

An adsorption column was made up from the 3.79 in. long, 0.976 in. diameter sample. The weight of the sample was 19.83 g. The column was tested for MS-2 bacteriophage adsorption at a high flow rate of 3000 ml/hr (64.60 column volumes/hr) of water spiked with $5.6 \times 10^7$ PFU/ml of MS-2. The removal of MS-2 was better than 5 logs (99.999991%) for 10 min, then 5 logs for the next 10 minutes. The adsorption was stopped after 20 minutes before saturation was reached. Detailed results and conditions of the virus adsorption test are shown for column #8 in Table 3.

Example 9

The production method for this sample is similar to that for column # 8. It was made from 28 g of P200 pitch-based carbon fibers (R303T), 120 cc of water and 7 g of Durez 2-step phenolic resin.

The cured composite was then activated in steam at 877° C. for 3.5 hours at a nitrogen flow rate of 2 L/min. and a water flow rate of 100 cc/hour. The burnoff was 26.6%. The BET surface area of the material was 866 $m^2/g$. The density of material was 0.435 g/cc.

An adsorption column was made up from the 3.77 in. long, 0.976 in. diameter sample. The weight of the sample was 20.12 g. The sample was tested for MS-2 bacteriophage adsorption at a high flow rate of 3000 ml/hr (64.90 column volumes/hr) of water spiked with $5.6 \times 10^7$ PFU/ml of MS-2. The removal of MS-2 was better than 5 logs (99.99991%) for 10 min, then 5 logs (99.999%) for the next 10 min. The adsorption was stopped after 20 min. before saturation was reached. Detailed results and conditions of virus adsorption test are shown in Table 3 (note column #9).

Summary of Adsorption Studies of MS-2 Bacteriophage Completed in Example 1–9

Figure 4:
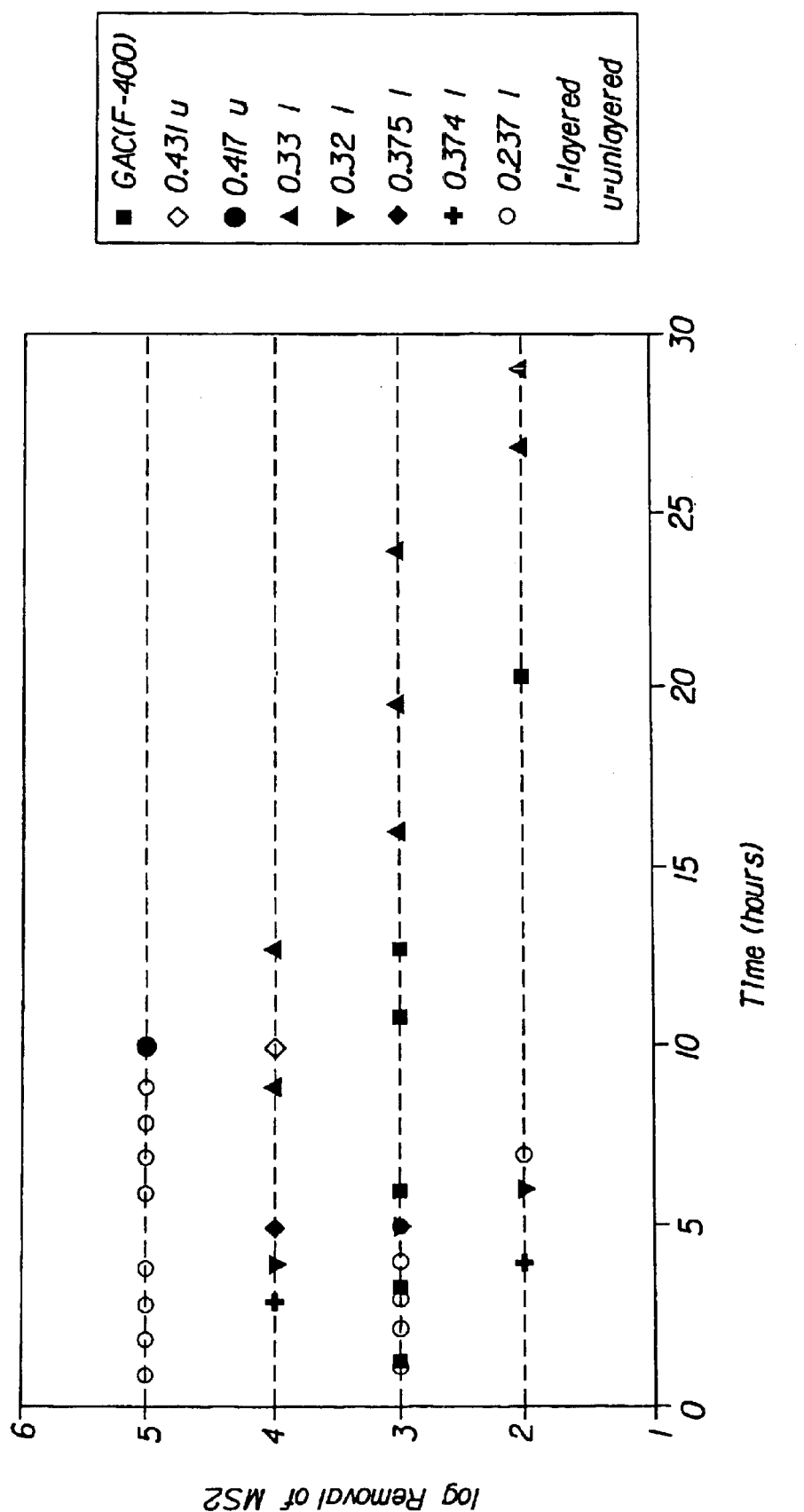
FIG. 4 is a graphical illustration showing the adsorption of MS-2 bacteriophage on a prior art granulated activated carbon (GAC) filter versus several activated carbon fiber composite filters of the present invention having different densities.
Figure 5:
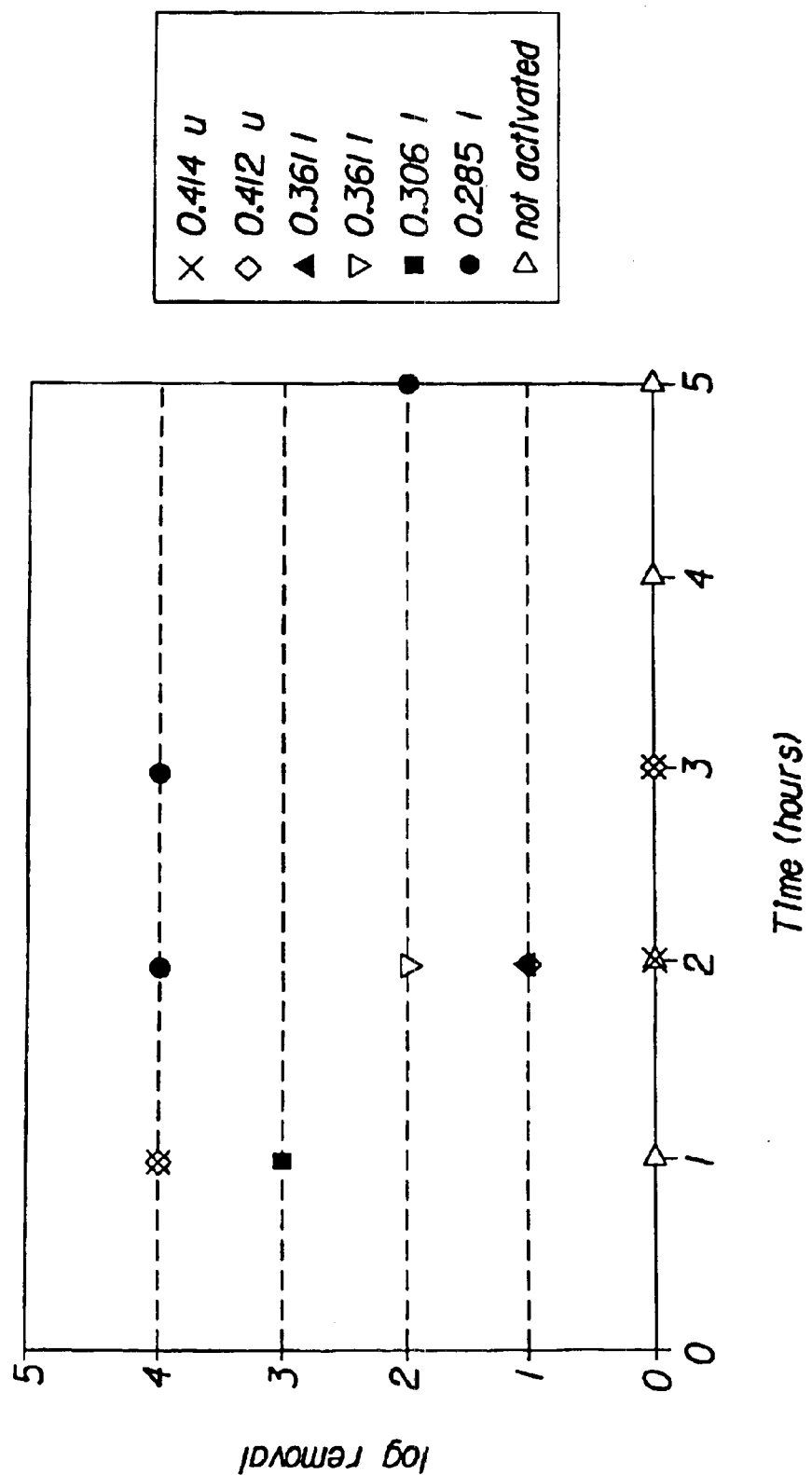
FIG. 5 is a graphical representation showing the adsorption of *E. coli* on activated carbon fiber composite filters of the present invention produced by different methods and having different densities.
Figure 6:
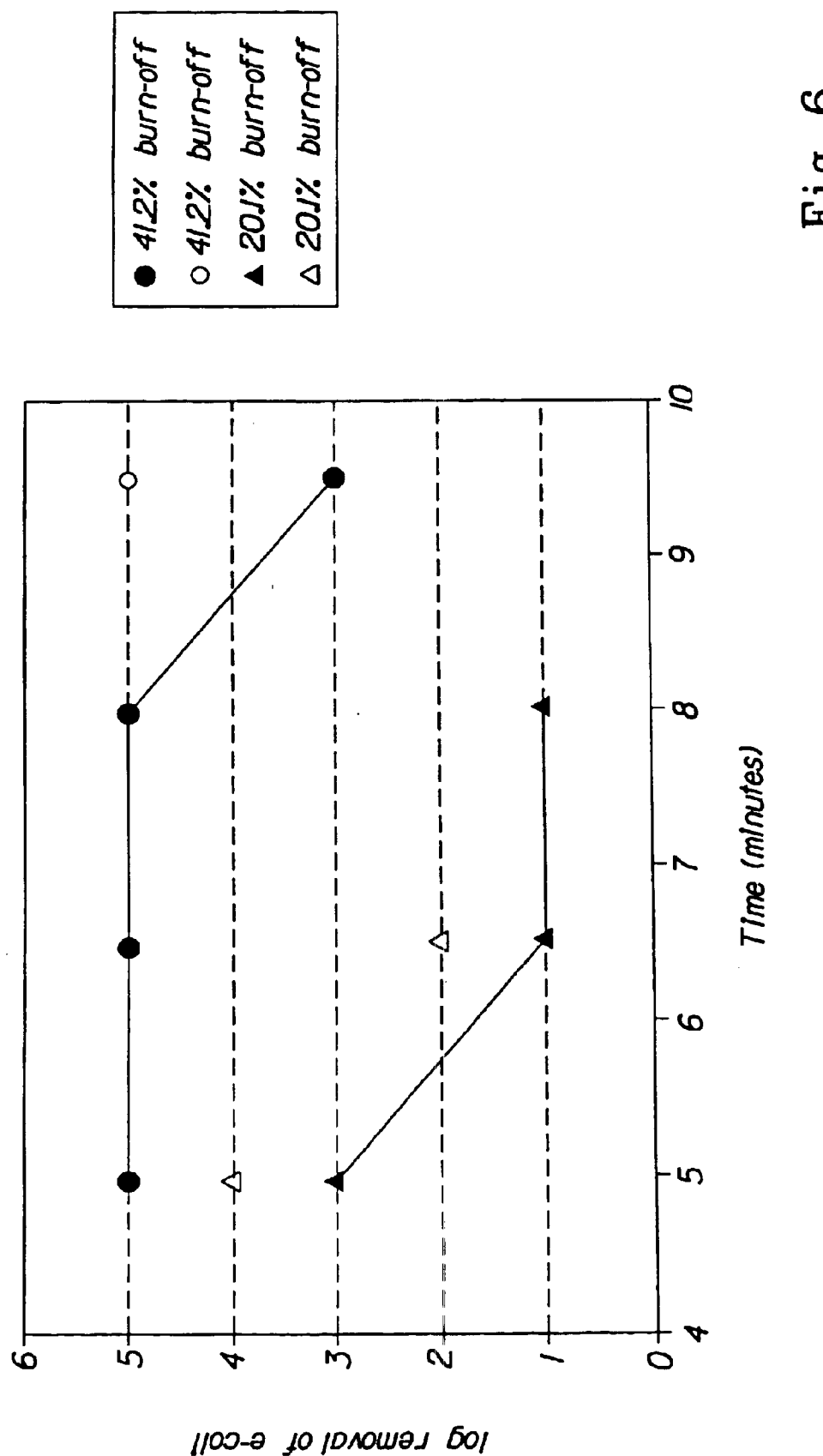
FIG. 6 is a graphical illustration demonstrating the log removal of *E. coli* over activated carbon fiber composite filters of the present invention undergoing different burn-off during processing.

A summary of all column studies of MS-2 bacteriophage adsorption is shown in Tables 1 and 2 for flow rates ranging from 259 ml/hr to 330 ml/hr (or 7.7–10.5 column volumes/hr), and Table 3 for a flow rate of 3000 ml/hr (up to 64.9 column volumes/hr) and plotted on a logarithmic scale in FIG. 4. It is apparent from the figure that the efficiency of composites in virus removal increases with density, relating in turn to reducing the mean inter-fiber spacing. Virus removal was at least 5 logs at flow rates of 8.8 and 64.9 column volumes per hour and an inlet concentration of MS-2 of up to $5.6 \times 10^7$ PFU/ml.

Figure 3:
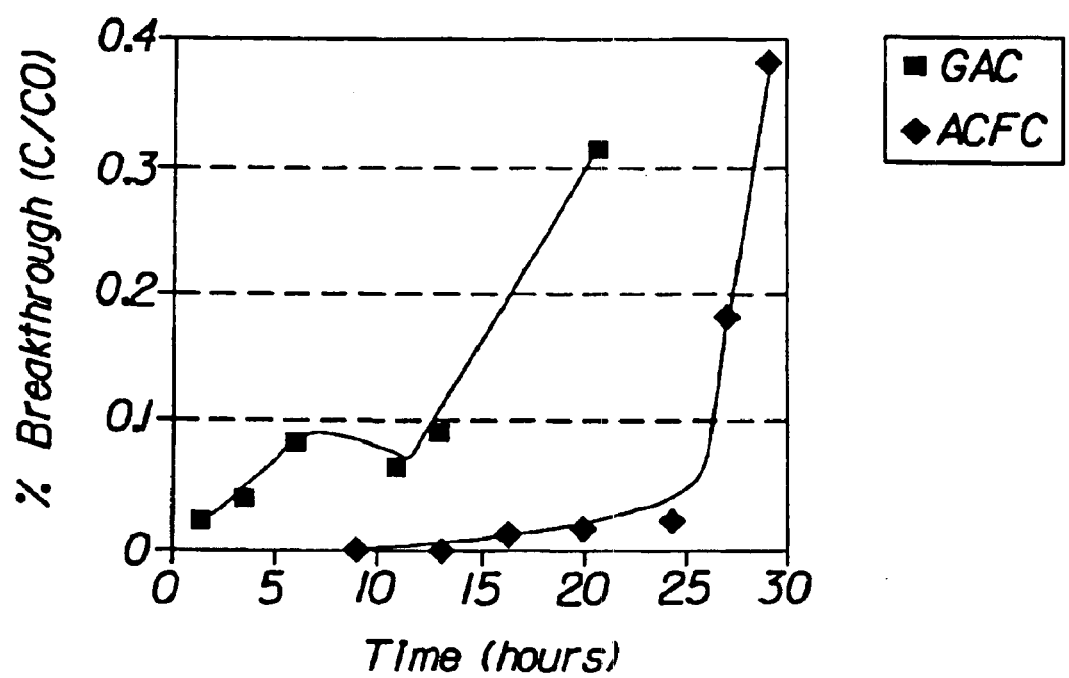
FIG. 3 is a graphical illustration showing the removal of viruses from water comparing the performance of the drinking water filter of the present invention with a granular activated carbon filter presently in commercial use.

1) MS-2 bacteriophage adsorption is much better for the ACFC filter of the present invention than the prior art GAC filter, FIG. 3.

2) The efficiency of composites in virus removal increases with density and with reducing the inter-fiber spacing: Virus removal was at least 99.999% for flow rates of 4 and 50 ml/min and at loading concentrations of up to $5.6 \times 10^7$ PFU/ml, FIG. 4 and Table 3. When concentration of influent was increased to $7.5 \times 10^8$ PFU/ml and $5.6 \times 10^8$ PFU/ml, the virus removal was 99.99999% for flow rates of both 4 and 20 ml/min.

The efficiency of the composite is highest when inter-fiber spacing is small and density high. In Example 3, where there is only 3 logs MS-2 bacteriophage removal, the density is 0.24 g/cc and inter-fiber spacing is 73.1 $\mu$m. Conversely, in examples 6 & 7, where there is 5 logs removal for 10 hours, the density is 0.417 and 0.431 g/cc and inter-fiber spacing is only 43.8 microns ($\mu$m).

Note that even though these flow rates are low, ranging from 259 ml/hr to 3000 ml/hr (or is 7.7–67.0 column volumes/hr), the composites are expected to work at higher flow rates. A second point is that these concentrations of viruses are extremely high (higher than the EPA requirements) so filters will last much longer before breakthrough in any practical application in virus removal from drinking water.

TABLE 1

Removal of MS-2 bacteriophage from Water by ACFCs of Different Densities

| [MS-2] (PFU/ml) | | | | | | | |
|---|---|---|---|---|---|---|---|
| 2.82E+06 | 2.67E+07 | 3.00E+07 | 8.00E+06 | 8.20E+06 | 8.20E+06 | 1.40E+07 | 1.40E+07 |
| Density (g/cc) | | | | | | | |
| 0.37 | 0.33 | 0.32 | 0.237 | 0.375 | 0.374 | 0.431 | 0.417 |
| Example # | | | | | | | |
| Prior Art | 1 | 2 | 3 | 4 | 5 | 6 | 7 |

| Time (hr) | Prior Art | 1 | 2 | 3 | 4 | 5 | 6 | 7 |
|---|---|---|---|---|---|---|---|---|
| | | | Removal (%) | | | | | |
| 1 | | | 99.999 | 99.95 | 99.9994 | 99.9994 | 99.9998 | 99.9998 |
| 1.3 | 99.977 | | | | | | | |
| 2 | | | 99.999 | 99.95 | 99.9994 | 99.9994 | 99.9998 | 99.9998 |
| 3 | | | 99.999 | 99.95 | 99.9994 | 99.996 | 99.9998 | 99.9998 |
| 3.4 | 99.961 | | | | | | | |
| 4 | | | 99.99 | 99.95 | 99.9994 | 99.897 | 99.9998 | 99.9998 |
| 5 | | | 99.92 | 99.95 | 99.9939 | | | |
| 6 | 99.917 | | 99.25 | 99.95 | 99.79 | | | |
| 7 | | | | 99.72 | | | 99.999 | 99.9998 |
| 8 | | | | | | | 99.999 | 99.9998 |
| 9 | | 99.99 | | | | | 99.999 | 99.9996 |
| 10 | | | | | | | 99.997 | 99.9995 |
| 10.8 | 99.934 | | | | | | | |
| 12.7 | 99.908 | 99.99 | | | | | | |
| 16 | | 99.987 | | | | | | |
| 19.7 | | 99.984 | | | | | | |
| 20.3 | 99.686 | | | | | | | |
| 24 | | 99.98 | | | | | | |
| 26.8 | | 99.82 | | | | | | |
| 28.9 | | 99.62 | | | | | | |

(Flow rate: 259–330 ml/hr (7–10 column volumes/hr); MS-2 concentration range: $2.86 \times 10^6$ to $1.4 \times 10^7$)

TABLE 2

Removal of MS-2 bacteriophage from Water by ACFCs of Different Densities

| [MS-2] (PFU/ml) | | | | | | | |
|---|---|---|---|---|---|---|---|
| 2.82E+06 | 2.67E+07 | 3.00E+07 | 8.0E+06 | 8.20E+06 | 8.20E+06 | 1.40E+07 | 1.40E+07 |
| Density (g/cc) | | | | | | | |
| 0.37 | 0.33 | 0.32 | 0.237 | 0.375 | 0.374 | 0.431 | 0.417 |
| Example # | | | | | | | |
| Prior art | 1 | 2 | 3 | 4 | 5 | 6 | 7 |

| Time (hr) | Prior art | 1 | 2 | 3 | 4 | 5 | 6 | 7 |
|---|---|---|---|---|---|---|---|---|
| | | | Log Removal | | | | | |
| 1 | | | 5 | 3 | 4 | 4 | 5 | 5 |
| 1.3 | 3 | | | | | | | |
| 2 | | | 5 | 3 | 4 | 4 | 5 | 5 |
| 3 | | | 4 | 3 | 4 | 4 | 5 | 5 |
| 3.4 | 3 | | | | | | | |
| 4 | | | 4 | 3 | 4 | 2 | 5 | 5 |
| 5 | | | 3 | 3 | 4 | | | |
| 6 | 3 | | 2 | 3 | 2 | | 5 | 5 |
| 7 | | | | 2 | | | 5 | 5 |
| 8 | | | | | | | 5 | 5 |
| 9 | | 4 | | | | | 5 | 5 |
| 10 | | | | | | | 4 | 5 |
| 10.8 | 3 | | | | | | | |
| 12.7 | 3 | 4 | | | | | | |
| 16 | | 3 | | | | | | |
| 19.7 | | 3 | | | | | | |
| 20.3 | 2 | | | | | | | |
| 24 | | 3 | | | | | | |
| 26.8 | | 3 | | | | | | |
| 28.9 | | 3 | | | | | | |

(Flow rate: 259–330 ml/hr (7–10 column volumes/hr), MS-2 concentration range: $2.86 \times 10^6$ to $1.4 \times 10^7$)

TABLE 3

Removal of MS-2 bacteriophage from Water

| | Density (g/cc) | | | |
|---|---|---|---|---|
| | 0.427 | 0.427 | 0.435 | 0.435 |
| | Example # | | | |
| | 8 | 8 | 9 | 9 |
| | Removal | | | |
| Time (min.) | Log | (%) | Log | (%) |
| 5 | 5 | 99.999991 | 5 | 99.99992 |
| 10 | 5 | 99.999991 | 5 | 99.99996 |
| 15 | 5 | 99.99997 | 5 | 99.99994 |
| 20 | 5 | 99.99995 | 5 | 99.99983 |

(Flow Rate 3000 ml/hr; MS-2 Concentration $5.6 \times 10^7$ PFU/ml)

Example 10

Adsorption of *Cryptosporidium paryum*, Organics, Herbicides and Lead 100 g of P 400 pitch-based carbon fiber was mixed with 25 g resin and 1000 cc of water. The slurry was poured into a mold and the mixture was allowed to settle for 10 seconds before applying a vacuum for 1 min. The composite was ejected from the mold, and cured at 2000° C. for 3 hr. The cured composite was then activated in steam at 877° C. for 2 hr. at a nitrogen flow rate of 2 L/min. and a water flow rate of 60 to 70 cc/hour. The burnoff was 47%. The BET surface area of the material was 1179 m²/g.

A column #10 was made that was 2 in. long and 1.5 in. diameter. Potable water was dosed with contaminants listed in Table 4, and pumped through the filter at a rate of 1.9 L/min. A total of four liters of water were used. The pH of the water was 7.6 and it was obtained from a local tap water supply.

The sample was tested for *Cryptosporidium parvum* adsorption at a flow rate of 1.9 L/min. of water spiked with 186,000 cysts/ml. The composite removed better than 3 logs or 99.94% of the *C. parvum*.

The loading of *C. parvum* is extremely high. Hence the material will perform even better under more normal conditions when lower concentrations of contaminants are present.

The water was tested for chlorine adsorption at the same flow rate of water spiked with 3.0 mg/L of chlorine. The column removed better than 98% of chlorine.

The sample removed more than 98% of the herbicide lindane and more than 97% of 2,4 D loaded at 10 mg/L respectively. The sample removed better than 98% of chloroform when loaded at 300 mg/L and 90% of lead when loaded at 147 mg/L.

TABLE 4

Comparison of Activated Carbon Fiber Composite (ACFC) and a Commercial GAC Water treatment carbon (Calgon F-400) in Water Treatment

| Contaminant | Inlet Conc. | Outlet Conc. GAC | % Removed GAC | Outlet conc. ACFC | % Removed ACFC |
|---|---|---|---|---|---|
| Odor | 2 | 1 | NA | 1 | NA |
| Chlorine | 3.0 mg/L | <0.05 | >98 | <0.05 | >98 |
| Lindane | 10 mg/L | <0.2 | >98 | <0.2 | >98 |
| 2,4-D | 200 mg/L | 12 | 94 | 5.4 | 97 |
| Chloroform | 300 mg/L | 8 | 97 | <5 | >98 |
| Lead | 147 mg/L | 20 | 86 | 14 | 90 |
| Cryptosporidium | 186,000 cysts/ml | 230 | >99 | 110 | >99 |

Examples 11 through 21 relate to adsorption of *E. coli*.

Example 11

The column #11 was cut from a large block of carbon fiber composites OR 198. The production method for this block, which give a layered composite, involves mixing P200 pitch-based carbon fibers (R303T) with water and Durez 7716 2-step phenolic resin in a weight ratio of resin to fiber of 1:4 in a dilute slurry (slurry concentration about 15%). After mixing, part of the slurry was poured in a mold while water was drawn through a filter by vacuum and the fiber-resin mixture adapted to the mold shape. The remainder of the slurry was added in increments, providing sufficient times for water drainage. After the last part of the slurry was added, vacuum was applied for 40 minutes to draw the remaining water through the cake and effect partial drying. The composite was then ejected from the mold, and dried and cured at 200° C., and carbonized it 650° C.

The composite was then activated in steam at 877° C. for 30 minutes in a nitrogen flow of 2 liters per minute and a water flow rate of 60–70 cc/hr. The burnoff was 8%, and the composite was further activated at 877° C. for 1.5 hr. with a water flow rate of 100 cc/hr. The burnoff in this stage was 15.7%, giving a total bumoff of 23.0%. Including the loss on carbonization, the net weight loss was 32%. The BET surface area of the final product was 969 m²/g. A column of activated composite was cut from the block using a drill press fitted with a 1 in. diameter core extractor. The length of the column was 3.35 in.; the outside diameter was 0.91 in. and the weight was 10.1 g. The density of the column material was 0.285 g/cc.

The sample was tested for *E. coli* adsorption at a flow rate of 300 ml/hr (8.48 column volumes/hr) of water spiked with $1.5 \times 10^5$ PFU/ml of *E. coli*. The removal of *E. coli* was better than 4 logs (99.997%) for 2 hours, 4 logs (99.99%) in the $3^{rd}$ hour, and 2 logs (99.83%) in the $4^{th}$ hour. Detailed results of the *E. coli* adsorption tests are shown in Tables 5 and 6 (Column 11).

Example 12

A composite was made from 20.0 g of P 200 pitchbased carbon fibers. The fibers were mixed with 100 cc of water and 5.0 g of phenolic resin were added to the mixture. The slurry was poured into a mold (1 in. diameter PVC tube) and then evacuated to remove the water. The composite was ejected from the mold, and cured at 200° C. and carbonized to 650° C. for two hours. The density of material was 0.364 g/cc.

The sample column # 12 was tested for *E. coli* adsorption at a flow rate of 300 ml/hr of water spiked with $1.95 \times 10^5$ CFU/ml. The removal of *E. coli* was 0 logs (59.7%) for 1 hour (see Table 5). Hence, non-activated composites are not effective for *E. coli* removal.

Example 13

The column # 13 to be tested was cut from three different blocks of carbon fiber composites OR 193, 198 and 210. The production method for these blocks give layered composites. It involved mixing P 200 pitch based carbon fibers (R303T) with water and Durez 7716 2-step phenolic resin in a weight ratio of resin to fiber of 1:4 to form a dilute slurry (slurry concentration about 15%). After mixing, part of the slurry was poured into a mold while water was drawn through a filter by vacuum, and the fiber-resin mixture adapts to the mold shape. The remainder of the slurry was added in increments, providing sufficient times for water drainage. After the last part of the slurry was added, vacuum was applied for 40 min. to draw the remaining water through the cake and effect partial drying. The composite was then ejected from the mold, and dried and cured at 200° C.

The composites were activated in steam at 877° C. for 1.5 hr. at a nitrogen flow rate of 2 L/min. and a water flow rate of 100 cc/hour. The overall burnoff for the three samples was 29.5, 30.5 and 19.4%. The total carbonization and activation yield losses were 37.5, 38.5 and 28.4%. The BET surface area of the material was 603 to 620 $m^2/g$.

A column was cut from the blocks using a drill press fitted with a 1 in. diameter core extractor. The length of the core was 2.53 in., the outside diameter was 0.91 in. and the weight was 8.18 g. The density of material was 0.306 g/cc.

The sample was tested for *E. coli* adsorption at a flow rate of 300 ml/hr (or 11.13 column volumes per hour) of water spiked with $4 \times 10^5$ CFU/ml of *E. coli*. The removal of *E. coli* was 3 logs (99.91%) for 1 hour, and one log (96.53%) in the second hour. Detailed results of bacteria adsorption test are shown in Tables 5 and 6 (note column #13).

Example 14

The column # 14 to be tested was cut from a 4 in. diameter cylindrical block of carbon fiber composite F 919. The production method for F 919, which gives a layered composite, was as follows. Two hundred grams of P200 pitch-based carbon fibers (R303T) were mixed with 10,000 cc of water and 50 g of Durez 7716 2-step phenolic resin was added to the mixture. After mixing for 5 minutes, about 3000 cc of slurry was poured in a 4 in. diameter cylindrical mold and allowed to settle for 1 min. while water drained through the filter before more slurry was added in increments of 200 cc. Each time, the fibers were allowed to settle for 1 min. before adding the next increment. After the last 200 ml was added, vacuum was applied for 40 min. to draw the remaining water through the cake and effect partial drying. The composite was then ejected from the mold, and dried and cured at 200° C. for 3 hours.

The cured composite was then activated in steam at 877° C. for 4.5 hours at a nitrogen flow rate of 2 L/min. and a water flow rate of 100 cc/hr. The burnoff was 27.9%. The BET surface area of the material as 891 $m^2/g$.

A column was cut from the block using a drill press fitted with a 1 in. diameter core extractor. The length of the drilled core was 3.39 in., the outside diameter was 0.91 in. and the weight was 13.03 g. The density of material was 0.361 g/cc. The sample was tested for *E. coli* adsorption at a flow rate of 300 mythr (or 8.30 column volumes per hr) of water spiked with $1.3 \times 10^6$ CFU/ml of *E. coli*. The removal of *E. coli* was better than 4 logs (99.998%) for 1 hour and 2 logs (99.32%) in second hour. Detailed results of bacteria adsorption test are shown in Table 5 and 6 (note column #14).

Example 15

This column # 15 was made from the same material as in column # 14. The method of making was therefore identical. The burnoff was 27.9%. The BET surface area of the material was 891 $m^2/g$.

A column was cut from the block using a drill press fitted with a 1 in. diameter core extractor. The length of the drilled core was 3.52 in. and the outside diameter was 0.91 in. The sample was tested for *E. coli* adsorption at a flow rate of 318 ml/hr (or 8.48 column volumes per hour) of water spiked with $1.3 \times 10^6$ CFU/ml of *E. coli*. The removal of *E. coli* was better than 4 logs (99.998%) for 1 hour, and one log (98.6%) in the second hour. Detailed results of bacteria adsorption test are shown in Tables 5 and 6 (note column #15).

Example 16

The column # 16 to be tested was cut from a 4 in. diameter cylindrical block of carbon fiber composite F 920. The production method for F920 which gives an unlayered composite was as follows. Three hundred grams of P200 pitch-based carbon fibers (R303T) were mixed with 3000 cc of water and 75 g of Durez 7716 2-step phenolic resin. After mixing for 5 min., the slurry was poured into a 4 in. diameter cylindrical mold where the fiber-resin mixture adapted to the mold shape. The mixture was allowed to settle for 10 seconds before applying a vacuum for 20 min. The composite was ejected from the mold, and cured at 200° C. for 3 hr. The difference between this material and the ones described previously is that this one is made by pouring all the mixture in the mold simultaneously, not in increments, giving less time for the fibers to settle and creating a composite that was not layered.

The cured composite was then activated in steam at 877° C. for 4.5 hr. at a nitrogen flow rate of 2 L/min. and a water flow rate of 100 cc/hour. The burnoff was 25.2%. The BET surface area of the material was 550 $m^2/g$.

A column was cut from the block using a drill press fitted with a 1 in. diameter core extractor. The length of the core was 3.54 in. and the outside diameter was 0.907 in.

The sample was tested for *E. coli* adsorption at a flow rate of 328 ml/hr (or 8.78 column volumes per hour) of water spiked with $9.1 \times 10^5$ CFU/ml of *E coli*. The removal of *E. coli* was better than 5 logs (99.999%) for 1 hour, and 0 logs (82.2%) in the second hour. Detailed results of bacteria adsorption test are shown in Tables 5 and 6 (note column #16).

Example 17

This column #17 was made from the same material as column # 16. The method of making is identical. The burnoff was 25.2%. The BET surface area of the material was 550 $m^2 1$ g.

A column was cut from the block using a drill press fitted with a 1 in. diameter core extractor. The length of the core was 3.538 in. and the outside diameter was 0.907 in.

The sample was tested for *E. coli* adsorption at a flow rate of 320 ml/hr (or 8.54 column volumes per hour) of water spiked with $9.1 \times 10^5$ CFU/ml of *E. coli*. The removal of *E. coli* was better than 5 logs (99.999%) for 1 hour, and one log (95.2%) in the second hour. Detailed results of bacteria adsorption test are shown in Tables 5 and 6 (note column #17).

Example 18

The production method for this material which was made directly as a 1 in. diameter, 4 in. long column involved mixing 24 g of P200 pitch-based carbon fibers (R303T) with 120 cc of water and 6 g of Durez 2-step phenolic resin. After mixing, the slurry was poured into a mold made from a 1 in. ID PVC tube, where the fiber-resin mixture adapts to the mold shape. The mixture was allowed to settle for 10 seconds before applying a vacuum for 1 min. to draw the remaining water through the cake and effect partial drying. The composite was ejected from the mold, and cured at 200° C. for 3 hf.

The cured composite was then activated in steam at 877° C. for 3.0 hours at a nitrogen flow rate of 3.2 L/min. and a water flow rate of 160 cc/hr. The burnoff was 41.2%. The BET surface area of the material was 1146 m$^2$/g. The density of material was 0.322 g/cc. Note that this material has higher burnoff than the earlier materials.

An adsorption column was made up from the 3.68 in. long, 0.99 in. diameter sample. The weight of the sample was 15.20 g. The sample was tested for *E. coli* adsorption at a high low rate of 3000 ml/hr (or 63.7 column volumes per hour) of water spiked with 1.4×10$^6$ CFU/ml of *E. coli*. The removal of *E. coli* was better than 4 logs (99.998%) for 8 rain. The adsorption was stopped after 10 min. before saturation was reached. Detailed results and conditions of *E. coli* adsorption test are shown in Table 7 (note column #18).

Example 19

The production method for this sample was the same as that for the column # 18 made from 24 g of P200 pitch-based carbon fibers (R303T), 120 cc of water and 6 g of Durez 2-step phenolic resin.

The cured composite was then activated in steam at 877° C. for 3.5 hr. at a nitrogen flow rate of 2 L/min. and a water flow rate of 160 cc/hour. The burnoff was 41.3%. The Bet surface area of the material was 1148 m$^2$/g. Note that this material has higher burnoff than the earlier materials. The density of material was 0.326 g/cc.

An adsorption column was made up from a 3.64 in. long composite of diameter 0.988 in. weighing 14.91 g. The sample was tested for *E. coli* adsorption at a high low rate of 3000 ml/hr (or 65.0 column volumes per hour) of water spiked with 1.4×10$^6$ CFU/ml of *E. coli*. The removal of *E. coli* was better than 5 logs (99.9998%) for 9.5 min. The adsorption was stopped after 10 min. before saturation was reached. Detailed results and conditions of the *E. coli* adsorption test are shown in Table 7 (note column #19).

Example 20

The production method for this sample was the same as that for Column #18. It was made from 24 g of P200 pitch-based carbon fibers (R303T), 120 cc of water and 6 g of Durez 2-step phenolic resin.

The cured composite was then activated in steam at 877° C. for 3.5 hr. at a nitrogen flow rate of 3.2 L/min. and a water flow rate of 160 cc/hour. The burnoff was 21.3%. The BET surface area of the material was 765 m$^2$/g. The density of material was 0.437 g/cc. Note that this material had only half the burnoff of the two previous columns.

An adsorption column was made up from a 3.66 in. long composite of diameter 0.975 in. weighing 19.57 g. The sample was tested for *E. coli* adsorption at a high flow rate of 3000 ml/hr (or 67.0 column volumes per hour) of water spiked with 9.1×10$^5$ CFU/ml of *E. coli*. The removal of *E. coli* was better than 3 logs (99.97%) for 5 minutes. The adsorption was stopped after 10 minutes before saturation was reached. Detailed results and conditions of the *E. coli* adsorption test are shown in Table 7 (note column #20).

Example 21

The production method for this sample is the same as that for the column # 18. It was made from 24 g of P200 pitch-based carbon fibers (R303T), 120 cc of water and 6 g of Durez 2-step phenolic resin.

The cured composite was then activated in steam at 877° C. for 3.5 hr. at a nitrogen flow rate of 3.2 L/min. and a water flow rate of 160 cc/hour. The burnoff was 21.9%. The BET surface area of the material was 776 m$^2$/g. The density of the material was 0.418 g/cc. Note that this material has only half the burnoff of the previous columns #18 and #19.

An adsorption column was made up from a 3.69 in. long composite of diameter 0.999 in. weighing 19.79 g. The sample was tested for *E. coli* adsorption at a high flow rate of 3000 ml/hr (or 63.3 column volumes per hour) of water spiked with 9.1×10$^5$ CFU/ml of *E. coli*. The removal of *E. coli* was better than 4 logs (99.99%) for 5 min. The adsorption was stopped after 10 min. before saturation was reached. Detailed results and conditions of *E. coli* adsorption test are shown in Table 7 (note column #21).

TABLE 5

Removal of *E. coli* from Water by ACFCs of Differing Densities

| | \[*E. coli*\] (CFU/ml) | | | | | | |
|---|---|---|---|---|---|---|---|
| | 1.5E+05 | 1.95E+05 | 4.0E+05 | 1.3E+06 | 1.3E+06 | 9.1E+05 | 9.1E+05 |
| | | | | Density | | | |
| | 0.285 | not act | 0.306 | 0.361 | 0.348 | 0.414 | 0.412 |
| | | | | Example # | | | |
| | 11 | 12 | 13 | 14 | 15 | 16 | 17 |
| Time (hr) | | | | Removal (%) | | | |
| 0.5 | | | | | | | |
| 1 | 99.9967 | 60 | 99.914 | 99.9984 | 99.9984 | 99.9989 | 99.9989 |
| 1.5 | | | | | | | |
| 2 | 99.9967 | 43.59 | 96.553 | 99.32 | 98.577 | 82.19 | 95.22 |
| 3 | 99.99 | 38.46 | 87.8 | 79.84 | 73.2 | 47.58 | 41.76 |
| 4 | | 43.59 | | | | | |

TABLE 5-continued

Removal of *E. coli* from Water by ACFCs of Differing Densities

| | | | [*E. coli*] (CFU/ml) | | | |
|---|---|---|---|---|---|---|
| 1.5E+05 | 1.95E+05 | 4.0E+05 | 1.3E+06 | 1.3E+06 | 9.1E+05 | 9.1E+05 |
| | | | Density | | | |
| 0.285 | not act | 0.306 | 0.361 | 0.348 | 0.414 | 0.412 |
| | | | Example # | | | |
| 11 | 12 | 13 | 14 | 15 | 16 | 17 |

| Time (hr) | | | | Removal (%) | | | |
|---|---|---|---|---|---|---|---|
| 5 | 99.832 | 33.33 | | | | | |
| 6 | 99.299 | 43.59 | | | | | |

(Flow Rate 300–328 ml/hr (8.3–8.8 column volumes/hr); *E. coli* concentration range of 2.86 × $10^6$ to 1.4 × $10^7$)

TABLE 6

Removal of *E. coli* from Water by ACFCs of Differing Densities

| | | | [*E. coli*] (CFU/ml) | | | |
|---|---|---|---|---|---|---|
| 1.5E+05 | 1.95E+05 | 4.0E+05 | 1.3E+06 | 1.3E+06 | 9.1E+05 | 9.1E+05 |
| | | | Density | | | |
| 0.285 | not act | 0.306 | 0.361 | 0.348 | 0.414 | 0.412 |
| | | | Example # | | | |
| 11 | 12 | 13 | 14 | 15 | 16 | 17 |

| time (hr) | | | | Removal (log) | | | |
|---|---|---|---|---|---|---|---|
| 0.5 | | | | | | | |
| 1 | 4 | 0 | 3 | 4 | 4 | 4 | 4 |
| 1.5 | | 0 | | | | | |
| 2 | 4 | 0 | 1 | 2 | 1 | 0 | 1 |
| 3 | 4 | 0 | 0 | 0 | 0 | 0 | 0 |
| 4 | | 0 | | | | | |
| 5 | 2 | 0 | | | | | |
| 6 | 2 | 0 | | | | | |

(Flow Rate 300–328 ml/hr (8.3–8.8 column volumes/hr); *E. coli* concentration range of 2.86 × $10^6$ to 1.4 × $10^7$)

TABLE 7

Removal of *E. coli* from Water by ACFCs of Differing Burnoffs

| | Burnoff (%) | | |
|---|---|---|---|
| 41.2 | 41.2 | 20.1 | 20.1 |
| | [*E. coli*] (CFU/ml) | | |
| 1.4E+06 | 1.4E+06 | 9.1E+05 | 9.1E+05 |
| | Density (g/cc) | | |
| 0.322 | 0.326 | 0.437 | 0.418 |
| | Example # | | |
| 18 | 19 | 20 | 21 |

| | | | | | Removal | | | |
|---|---|---|---|---|---|---|---|---|
| Time (min) | Log | (%) | log | (%) | log | (%) | log | (%) |
| 5 | 5 | 99.9998 | 5 | 99.9998 | 3 | 99.97 | 4 | 99.99 |
| 6.5 | 5 | 99.9998 | 5 | 99.9998 | 1 | 98.42 | 2 | 99.38 |
| 8 | 5 | 99.9997 | 5 | 99.9998 | 1 | 93.94 | 1 | 98.34 |
| 9.5 | 3 | 99.9 | 5 | 99.9998 | | | | |

(Flow Rate 3000 ml/hr (63–67 column volumes/hr); *E. coli* Concentration 1 × $10^6$–1.4 × $10^6$)

Summary of *E. coli* Adsorption Studies from Examples 12–24

From the data in Tables 5 and 6 and FIG. 3, it is apparent that the efficiency of the composite increases with composite density, FIG. 3.

FIG. 4 and Table 7 illustrate that the efficiency of bacteria removal is also dependent on the extent of carbon burnoff. The sample with 40% burnoff (Columns 31 and 32) gives 5 logs of removal while the sample with 20% burnoff (Columns 35 and 36) only gives 4 logs or less of removal.

The data also shows that the composites can remove at least 5 logs of bacteria at a flow rate of up to 3000 ml/min (up to 67 column volumes/hr) for an inlet concentration of $1.4 \times 10^6$ CFU/ml. When the inlet concentration of *E coli* was increased to $5.5 \times 10^9$ CFU/ml of *E. coli* the removal efficiency was at least 99.999999%. The concentrations of *E. coli* used in these experiments are much higher than what would be experienced under normal conditions in water treatment.

A summary of the cured composite density, inter-fiber spacing, void volume, activated composite density and burnoff parameters for various columns in Examples 1–21 is set forth in Table 8.

TABLE 8

ACFC Properties

| Example # | Cured Density (g/cc) | Inter Fiber Spacing (micron) | Void Volume (micron) | Activated Density (g/cc) | Burnoff (%) |
|---|---|---|---|---|---|
| MS-2 experiments | | | | | |
| 1 | 0.39 | 66.4 | 79.5 | 0.33 | 28.0 |
| 2 | 0.39 | 66.4 | 79.5 | 0.33 | 28.0 |
| 3 | 0.36 | 73.1 | 81.1 | 0.24 | 34.8 |
| 4 | 0.49 | 49.8 | 74.2 | 0.38 | 28.1 |
| 5 | 0.49 | 49.8 | 74.2 | 0.38 | 28.1 |
| 6 | 0.54 | 43.8 | 71.6 | 0.43 | 25.2 |
| 7 | 0.54 | 43.8 | 71.6 | 0.43 | 25.2 |
| 8 | 0.55 | 42.9 | 71.2 | 0.43 | 28.6 |
| 9 | 0.55 | 42.4 | 70.9 | 0.44 | 26.6 |
| *E. coli* experiments | | | | | |
| 11 | 0.36 | 73.1 | 81.1 | 0.24 | 34.8 |
| 13 | 0.37 | 70.8 | 80.5 | 0.30 | 32.0 |
| 14 | 0.47 | 52.5 | 75.3 | 0.36 | 27.9 |
| 15 | 0.47 | 52.5 | 75.3 | 0.36 | 27.9 |
| 16 | 0.54 | 43.8 | 71.6 | 0.41 | 25.2 |
| 17 | 0.54 | 43.8 | 71.6 | 0.41 | 25.2 |
| 18 | 0.52 | 46.0 | 72.6 | 0.32 | 41.2 |
| 19 | 0.51 | 47.2 | 73.2 | 0.33 | 41.3 |
| 20 | 0.52 | 46.0 | 72.6 | 0.44 | 21.3 |
| 21 | 0.52 | 46.0 | 72.6 | 0.42 | 21.9 |

Example 22

*E. coli* is a standard bacteria used in testing of bacteria removal from water and was used for most of the testing of the carbon fiber filters. To illustrate that the removal data for *E. coli* translates to other bacteria, a test has been done for the adsorption of the bacteria *A. hydrophila*. The production method for this composite, which was made as a 1 in. diameter, 4 in. long column involved mixing 24 g of P200 pitch-based carbon fibers (R303T) with 120 cc of water and 6 g of 1-step phenolic resin. After mixing, the slurry was poured into a mold made from a 1 in. ID PVC tube, where the fiber-resin mixture adapts to the mold shape. The mixture was allowed to settle for 10 seconds before applying a vacuum for 1 min. to draw the remaining water through the cake and effect partial drying. The composite was ejected from the mold, and cured at 200° C. for 3 hours.

The cured composite was then activated in steam at 850° C. for 4.5 hours at a nitrogen flow rate of 2 L/min. and a water flow rate of 102 cc/hour. The burnoff was 38%. The density of material was 0.346 g/cc.

An adsorption column was made up from the 2.01 in. long, 0.99 in. diameter sample. The weight of the sample was 8.19 g. The sample was tested for adsorption of *A. hydrophilia* by hydrating the composite with 10 cc of sterile saline (void volume of the column). 20 cc of a 0.1 MacFarland solution of *A. hydrophila* containing a total of $2.44 \times 10^8$ CFU was applied to the column over a one minute period. Two ml aliquots were collected serially for the first 10 ml and then every 50 ml until 1 liter of sterile saline had been passed over the column. Aliquots from each collection fraction were cultured. All cultures were sterile except the one collected at 750 ml of saline filtrate. This aliquot contained 1 CFU/ml. The total decrease in bacterial count was 7 logs or 99.99999%.

Examples 23 and 24; adsorption of mixtures of MS-2, *E. coli* and *Cryptosporidium parvum*.

Example 23

The production method for this material, which was made as a 1 in. diameter, 4 in. long column involved mixing 28 g of P200 pitch-based carbon fibers (R303T) with 120 cc of water and 7 g of Varcum 1-step phenolic resin. After mixing, the slurry was poured into a mold made from a 1 in. ID PVC tube, where the fiber-resin mixture adapts to the mold shape. The mixture was allowed to settle for 10 seconds before applying a vacuum for 1 min. to draw the remaining water through the cake and effect partial drying. The composite was ejected from the mold, and cured at 200° C. for 3 hr.

The cured composite was then activated in steam at 877° C. for 3.5 hr. at a nitrogen flow rate of 2 L/min. and a water flow rate of 100 cc/hour. The burnoff was 36.9%. The BET surface area of the material was 905 m²/g. The density of material was 0.359 g/cc.

An adsorption column was made up from the 3.73 in. long, 0.974 in. diameter sample. The weight of the sample was 16.36 g. The VRI, BRI and PRI was determined according to test methods described in section IX. The inlet concentrations of bacteria, viruses and protozoa are indicated in parenthesis after the BRI, VRI and PRI respectively.

| Length (inch) | Weight (g) | Burnoff (%) | Flow rate (ml/min) |
|---|---|---|---|
| 3.73 | 16.36 | 36.9 | 4 |

| TIME | BRI ($6.2 \times 10^8$ CFU/ml) | VRI ($7.510^8$ PFU/ml) | PRI ($1.4 \times 10^8$) |
|---|---|---|---|
| 1 Hour | 99.9993% | 99.99992% | 99.93% |
| 3 Hour | 99.999991% | 99.99992% | 99.93% |
| 6 Hour | 99.9999% | 99.99992% | 99.93% |
| 10 Hour | 99.9996% | 99.99992% | 99.93% |
| 15 Hour | 99.999991% | 99.99992% | 99.93% |

Example 24

The production method for this material which was made as a 1 in. diameter, 4 in. long column, involved mixing 28 g of P200 pitch-based carbon fibers (R303T) with 120 cc of water and 7 g of Varcum 1-step phenolic resin. After mixing, the slurry was poured into a mold made from a 1 in. ID PVC tube, where the fiber-resin mixture adapts to the mold shape. The mixture was allowed to settle for 10 seconds before applying a vacuum for 1 min. to draw the remaining water through the cake and effect partial drying. The composite was ejected from the mold, and cured at 200° C. for 3 hr.

The cured composite was then activated in steam at 877° C. for 3.5 hr. at a nitrogen flow rate of 2 L/min. and a water flow rate of 100 cc/hour. The burnoff was 44.0%. The density of material was 0.313 g/cc. An adsorption column was made up from the 3.75 in. long, 0.961 in. diameter sample. The weight of the sample was 13.85 g. The VRI, BRI and PRI was determined according to Test Methods described in Section IX. The inlet concentrations of bacteria, viruses and protozoea are indicated in parenthesis after the BRI, VRI and PRI, respectively.

| Length (inch) | Weight (g) | Burnoff (%) | Flow rate (ml/min) |
|---|---|---|---|
| 3.75 | 13.94 | 44.0 | 20 |

| TIME | BRI ($5.5 \times 10^9$ CFU/ml) | VRI ($5.6 \times 10^8$ CFU/m) | PRI ($2.4 \times 10^6$) |
|---|---|---|---|
| 0.5 Hour | 99.99991% | 99.99990% | 99.96% |
| 1 Hour | 99.9999990% | 99.99990% | 99.96% |
| 3 Hour | 99.9991% | 99.99990% | 99.96% |
| 6 Hour | 99.9999990% | 99.99990% | 99.96% |

Example 25

The production method for this sample, which was made as a 1 in. diameter, 4 in. long column, involved mixing 24 g of P200 pitch-based carbon fibers (R303T) with 120 cc of water and 6 g of Varcum 1-step phenolic resin. After mixing, the slurry was poured into a mold made from a 1 in. ID) PVC tube, where the fiber-resin mixture adapts to the mold shape. The mixture was allowed to settle for 2 seconds before applying a vacuum for 1 min. to draw the remaining water through the cake and effect partial drying. The composite was ejected from the mold, and cured at 200° C. for 3 hr.

The cured composite was then activated in steam at 877° C. for 4.5 hr. at a nitrogen flow rate of 2 L/min. and a water flow rate of 100 cc/hour. The burnoff was 40.0%. The density of material was 0.313 g/cc. An adsorption column was made up of a 0.975 in. diameter by 3.55 in. length weighing 13.62 g. The sample was tested for *E. coli* adsorption at a flow rate of 6000 ml/hr (or 132 column volumes/hr) of water spiked with $5 \times 10^8$ CFU/ml of *E. coli*. The removal of *E. coli* was 6.8 log for 15 hours. Additionally, the MS2 removal was at least 4.5 log up to 10 hours The VRI, BRI and PRI was determined according to Test Methods described in Section IX In summary, numerous benefits result from employing the concepts of the ACFC's of the present invention. An ACFC filter is provided that is useful as a respirator filter or a clean water/drinking water filter. The composite filter has an unique open internal structure and a large reactive surface for adsorption which allows for more efficient and rapid removal of contaminants that is attainable with conventional filters of granular activated carbons. Further, this efficient adsorption is achieved in a relatively short contact time and with low pressure energy requirements. Further, no channeling or by-pass of contaminants will occur when in a very thin bed as the filter is a monolithic body with the fibers firmly held or bound in position.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, the carbon fibers may be preactivated before mixing to form the slurry used in production of the composite filter. This advantageously precludes the need for extensive steam activation of the formed composite.

VI. Filters Comprising Free Activated Carbon Fibers

As discussed above, in one aspect, the present invention is directed to filters comprising free activated carbon fibers. The discussion in this section relates to such structures. In Section V above, the activated carbon fiber composites (ACFC) of the present invention are discussed in detail.

One process for building a free activated carbon fiber filter capable of removing viral pathogens from a liquid comprises placing activated carbon fibers into a hollow cylinder and applying linear force along the axis of the cylinder, thus compressing the fibers. It is to be understood that the liquid to be treated will be flowed along the axis of the cylinder which is also the axis of compression. The axial compression described is but one means of compressing fibers and other means of compression include, but are not limited to, hydraulic pressure across a membrane, opposed knuckles on a roller pressing against the fibers placed in a hollow form, a levered pressing element, and a hydraulic press. It is to be further understood that the cylinder could as well be any other shape such as box or cone which lends itself to axial compression of the fibers. Additionally, the activated carbon fibers can be shaped into an annular shape to take advantage of radial flow.

Further and optionally, the carbon fibers may be selected from a range of diameters so that when placed together, the interstitial spacing between the first, and larger, diameter fibers will closely conform to the second, and smaller, diameter fibers, and so that successively smaller diameter fibers will closely conform with the remaining interstitial space between the various selected larger fibers. By the selection of fiber diameters and lengths, the size, form and surface area of the interstitial space can be substantially controlled and made uniform at a smaller scale than would be possible if a single fiber diameter is used. Additionally, the activated carbon fibers may be combined with other materials, of different shapes, to control interstitial spacing. Such materials may be carbonaceous or non-carbonaceous. Further and optionally, the activated carbon fibers may be treated with a bacteriostatic agent such as closely bound silver or other bacteriostatic means to prevent bacterial colonies from developing on the activated carbon surfaces. However, to ensure that a filter is serving the function of removing pathogens by size exclusion and/or adsorption per the present invention, as opposed to simply "killing" the pathogens, it is important that the filter be tested without application of chemical agents that provide antibiotic effects.

Figure 7:
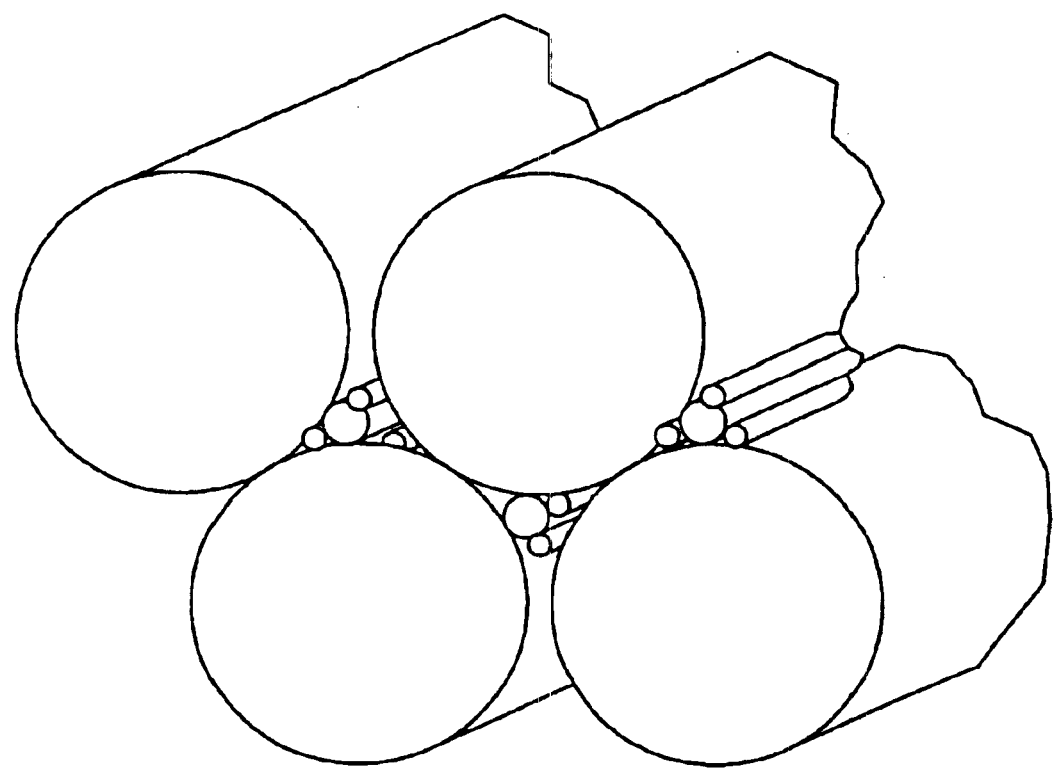
FIG. 7 is a cross sectional view of a plurality of activated carbon fibers of a filter of the present invention. The fibers have varying diameters.

In one embodiment illustrated in FIG. 7, the activated carbon filter may be comprised of aligned larger fibers compressed with a plurality of smaller fibers so that the smaller fibers fill in the interstitial space between the large fibers forming successively smaller and parallel interstitial spaces along the axis of the fibers and continuous in the axial fiber direction through the entire structure. In this embodiment it can be seen that the size of the interstitial spaces created is much smaller than the fiber members and uniform through the structure and can readily be controlled by the diameter of the fibers selected.

The following Examples A and B illustrate a filter of the present invention comprising free ACFs and also illustrate how one measures the BRI, VRI and PRI, as per the description in the Test Methods described in Section IX below. It should recognized that while these pathogen removal indices relate to a flow rate of test fluid of 100 ml/min., many of the filters of the present invention will exhibit similar removal benefits at significantly higher flow rates.

Example A

Filter Preparation

Free ACF is packed for analysis as filters utilizing stainless steel cylindrical holders available from Robert James Sales, Inc., Cincinnati, Ohio, as part # PR1216. These holders have an internal diameter of 2.54 cm. The stainless steel holders are cleaned with dish washing detergent (e.g. Dawn®), bleach (e.g. Clorox®) and diluted with tap water (e.g., 5:1000 dilution). The holders are rinsed with warm tap water, then rinsed again with isopropyl alcohol. The holders are air dried for 3 hours then assembled and packed according to the following procedure.

An effluent end cap and gasket are clamped onto the stainless steel holders. An O-ring, a spacer, and a one inch diameter 80 mesh stainless steel screen is placed into the bottom of the tube. Fourteen grams of Anshan's Carboflex® P200T pitch-based activated carbon fiber are added to the holder. An O-ring, a stainless steel 80 mesh screen and spacer are inserted in order on top of the ACF in the cylinder. A gasket is placed on top of the holder. An influent piston/ screw end cap, with O-rings added to the piston, is inserted into the top of the holder and clamped on using a sanitary fitting clamp. A 8.76 cm target bed depth of ACF material is achieved by adjusting the piston position using a socket wrench. The bed volume is 44.4 cm³.

Influent Preparation

The influent is prepared by adding (seeding) the requisite volume of concentrated stock for each microorganism to 100 L of dechlorinated and sterilized water. The microorganisms are seeded into the 100 liters of water as the water is stirred with a 2 in. by ½ in. stir bar at maximum speed. The microorganisms used are MS-2 bacteriophage (American Type Culture Collection (ATCC); Rockville, Md.; ATCC # 15597B), *E. coli* (ATCC # 25922) and *Cryptosporidium parvum* (Pleasant Hill Farm; Troy, ID). The handling of the microorganisms and the determination of the volume of concentrated stock to add to the 100 L of water is described below in Section IX—Test Methods. The target concentrations in the influent are listed in Table A. A 50 ml sample of influent is collected (i.e., prior to passing through the filter) into a 50 ml graduated conical centrifuge tube for assay of MS-2 bacteriophage, *E. coli*, and *Cryptosporidium parvum*.

TABLE A

| Microorganism | Organisms/L |
|---|---|
| *E. coli* | $5 \times 10^8$ |
| MS-2 | $5 \times 10^8$ |
| *Cryptosporidium parvum* | $6 \times 10^6$ |

Microorganism Filtration

The filters prepared above are connected to an EXPERT Peristaltic pump (model CP-120) produced by Scilog, Inc. (Madison, Wis.) using Pharmed tubing (¼ in. ID with ¹⁄₁₆ in. wall thickness). The pump is calibrated to a flow rate of 100 ml/min using dechlorinated and sterile water.

Influent is flowed through the sample filter at a rate of 100 ml/min. for 15 hours (i.e., 135 bed or column volumes/hr). 50 ml samples of effluent are collected into 50 ml graduated conical centrifuge tubes for assay of MS-2 bacteriophage and *E. coli* at 1 hr., 3 hr., 6 hr., 10 hr. and 15 hr. Three 50 ml samples of effluent are collected into graduated conical centrifuge tubes for assay of *Cryprosporidium parvum* at the same time intervals as above. Table B outlines the amount of sample needed to perform an assay of each microorganism.

TABLE B

| Microorganism | Influent (ml/sample needed) | Effluent (ml/sample needed) |
|---|---|---|
| *E. coli* | 1 | 1 |
| MS-2 | 1 | 1 |
| *C. parvum* | 10 | 100 |

Microorganism Assays

Bacteria assay is conducted using the membrane filter technique according to "Standard Methods for the Examination of Water and Wastewater" (American Public Health Association (APHA), 20$^{th}$ edition, method #9222) on m-Endo Agar LES (Becton Dickinson Co., Cockeysville, Md.; Cat. #: 4311203). Serial dilution of influent samples is made in sterile tris buffered saline at pH 7.0. A serial dilution is performed by taking 0.3 ml of influent and adding it to 2.7 ml of tris buffered saline at pH 7.0 to give a 10:1 dilution. 0.3 ml of the 10:1 dilution is added to 2.7 ml of tris buffered saline (Trisma, Inc., St. Louis, Mo.) at pH 7.0 to give a 100:1 dilution. The serial dilution is continued until a $10^6$:1 dilution is produced. A serial dilution of effluent samples collected from the test units is performed until a $10^4$:1 dilution is produced. The influent and effluent dilution assays and measurements are performed in duplicate according to "Standard Methods for the Examination of Water and Wastewater" (APHA, 20$^{th}$ edition, method # 9222).

For bacteriophage MS-2, the influent or effluent samples are serially diluted in tris buffered saline in the same manner as the *E. coli* samples by taking 0.3 ml of influent or effluent and adding to 2.7 ml of tris buffered saline. The dilution is continued until a $10^4$:1 dilution is produced. The 3 ml dilution is added to 3 ml of molten (46° C.) top agar (tryptic soy broth with 1% Bacto agar, Difco; Becton/Dickinson, Inc., Spark, Md.) containing 0.1 ml of log-phase culture of *E. coli* host (ATCC # 15597). The suspension is gently vortexed and poured onto solid tryptic soy agar plates. The tryptic soy agar (Difco; Becton/Dickinson, Inc.) is prepared by adding 40 g of the powder to 1 L of purified water in a 2 L Erlenmeyer flask set on a stir/hot plate. A 2 in. ×½ in. stir bar is added to the Erlenmeyer flask and the stir/hot plate is turned up to a medium setting. The tryptic soy agar solution is mixed thoroughly on the stir/hot plate and heated to boiling for 1 min. The solution is then autoclaved for 15 min. at 121° C. 15 ml of the tryptic soy agar is poured into a 92 mm×16 mm sterile Petri dish then cooled to produce the solid tryptic soy agar plate. The solid tryptic soy agar plates, along with the top agar solution that has been added, is incubated for 18–24 hours at 37° C. and then enumerated by counting plaques formed on the lawn of host *E. coli* cells.

The *Cryptosporidium parvum* assay is conducted by taking 10 ml of influent or 100 ml of effluent samples collected from the filters. The samples are centrifuged in a IEC Clinical Centrifuge (Needhan Hts, MA) at 400 g's for 15 min. to pellet the oocysts. The supernatant is aspirated off 1 ml above the pellet. The oocysts are counted using a SPotlite hemocytometer (Baxter Healthcare Corp. McGraw Park, IL) by placing 0.2 ml of sample onto the hemocytometer and using a phase contrast microscope (BH-2 Olympus, Japan)

at 400× magnification. At least 12 chamber aliquots are counted for each sample according to the procedure outlined in the Guidance Manual (U.S. EPA, October 1990). An average of all readings is multiplied with the conversion factor of $1.0 \times 10^4$. Total numbers of cysts are then divided by 10 for influent samples and by 100 ml for effluent samples to determine the number of oocysts per ml of sample.

Results

The test filter demonstrates the following pathogen removal properties:

| TIME | BRI | VRI | PRI |
|---|---|---|---|
| 1 Hour | 99.99998% | 99.99992% | 99.96% |
| 3 Hour | 99.99998% | 99.99992% | 99.96% |
| 6 Hour | 99.99998% | 99.99992% | 99.96% |
| 10 Hour | 99.99990% | 99.99992% | N/A |
| 15 Hour | 99.99987% | 99.99992% | N/A |

Example B

A filter is prepared according to Example A, except Anshan's Carboflex® P3200 pitch-based activated carbon fiber is added until 14.0 grams is reached. A 10.86 cm target bed depth of ACF material is achieved by adjusting the end screw length using a socket wrench. The filtration and assay protocols are performed the same as Example A. The bed volume is 55 cm$^3$ and the flow rate is 109 bed volumes/hour.

The test filter demonstrates the following pathogen removal properties:

| TIME | BRI | VRI | PRI |
|---|---|---|---|
| 1 Hour | 99.99998% | 99.99975% | 99.96% |
| 3 Hour | 99.99998% | N/A | 99.96% |
| 6 Hour | 99.99998% | 99.99975% | 99.96% |
| 10 Hour | 99.99998% | 99.99975% | N/A |

The embodiments described herein were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

VII. Other Filter Components

As indicated, the filters of the present invention will include, in addition to the activated carbon fibers, a housing for containing the activated carbon fibers, particularly when the fibers are not part of an ACFC. A pre-filter can be used to provide particulate filtration of suspended solids that exceed 10 to 100 μm in size. A biocidal agent such as silver can be used to prevent biofilm formation with the filter system In one embodiment, the filter will comprise a housing containing a generally cylindrical filter arrangement. The housing has a liquid inlet and a liquid outlet and defines a liquid flow path between the inlet and outlet. The activated carbon fiber arrangement is disposed within the housing in the liquid flow path and comprises a cylindrically shaped porous structure for removing particulate contaminants, chemical contaminants and microbiological contaminants from the liquid. The filter also includes impervious end members mounted to the ends of the filter arrangement, one of the end members having a central aperture. These end members direct liquid flow through the filter.

VIII. Articles of Manufacture

The articles of manufacture of the present invention comprise the filter and information that will inform the consumer, by written or spoken words and/or by pictures, that use of the filter will provide water filtration benefits which include removal of pathogens, particularly viruses, and this information may include the claim of superiority over other filter products. In a highly desirable variation, the article of manufacture bears the information that communicates that the use of the filter provides reduced levels of pathogens, including viruses. Accordingly, the use of packages in association with information that will inform the consumer, by words and/or by pictures, that use of the filter will provide benefits such as improved reduction of water contaminants as discussed herein, is important. The information can include, e.g., advertising in all of the usual media, as well as statements and icons on the package, or the filter itself, to inform the consumer of the unique pathogen removal capabilities. The information may be communicated only by verbal means, only by written means, or both. Obviously, the information need not be included directly with the product to constitute an article within this aspect of the invention. That is, for example, if a filter is sold and advertisements are communicated generally about the filter, this would constitute an article of this invention.

IX. Test Methods For Measuring Pathogen Removal Indices

The following is a description of methods for assessing a filter's ability to remove viruses (i.e., its Virus Removal Index), bacteria (i.e., its Bacteria Removal Index) and parasites (i.e., its Parasite Removal Index) when exposed to a challenge consisting of water containing those pathogens. Removal, in the context of this discussion, refers to a filter's ability to exclude pathogens from a source fluid by size exclusion and/or adsorption. Removal does not include the killing of pathogens by heat, radiation, use of an antimicrobial and the like. Thus, where a test filter is to be assessed for its pathogen removal indices according to the following test methods, that filter should not be treated with antimicrobial agents, in order to assess the filter true "removal" properties.

A. Concentrated Stock Preparation (1). *Escherichia coli* (*E. coli*)

Preparation of *E. coli* from American Type Culture Collection (ATCC): *E. coli* (ATCC # 15597, and ATCC # 25922) are received in a lypholyzed package. The *E coli* are resuspended with 1 ml of tryptic soy broth ("TSB") (Difco, (Becton/Dickinson), Spark, Md.). The resuspensions are added by means of a loop to the solid tryptic soy agar in a 92 mm×16 mm sterile Petri dish and five slant tubes. The tryptic soy agar ("TSA") (Difco (Becton/Dickinson), Spark, Md.) is prepared by adding 40 g of the powder to 1 L of purified water in a 2 L Erlenmeyer flask set on a stir/hot plate. A 2 in. ×½ in. stir bar is added to the Erlenmeyer flask and the stir/hot plate is turned to a medium setting. The TSA solution is mixed thoroughly on the stir/hot plate and is heated to boiling for 1 nmin. The solution is then autoclaved for 15 min. at 121° C. 15 ml of the TSA is pored into the Petri dish, then is cooled to produce the solid TSA plate. 10 ml of the TSA is poured into a slant tube and cooled at a 45° angle to produce the slant tubes. The Petri dish and slant tubes are grown in an incubator for 24 hours at 37° C. The slant tubes are stored in a 4° C. refrigerator until needed.

Preparation of *E. coli* (ATCC # 25922) for testing: A loop of culture from the Petri dish is used to inoculate 100 ml of TSB in a 100 ml conical centrifuge tube. The TSB is incubated and shaken for 24 hr. The 100 ml of TSB is centrifuged at 400 g's for 15 min. The TSB is decanted off and the pellet that remains is resuspended by vortexing in 30 ml of the same water used for testing. The centrifugation is repeated and the water is decanted off and the pellet is resuspended again in 30 ml of the same water used for testing. The E. coli is now ready for use in the test.

Preparation of E. coli (ATCC # 15597) for testing: A loop of culture from the Petri dish is added to 10 ml of TSB. The TSB is incubated at 37° C. for 24 hr. (no shaking). A loop of the TSB is added to 100 ml of TSB in a 150 ml Erlenmeyer flask and is vortexed. 1 ml of the 100 ml TSB is added to a test tube and incubated for 3 hr. at 37° C. with shaking. The E. coli is now ready for use as a host in the virus assay portion of the testing and for use is phage preparation.

(2). MS-2 Bacteriophage

MS-2 bacteriophage (phage) (ATCC # 15597B) is received lypholized. The phage is resuspended as indicated per ATCC instructions. New stocks of phage must be generated from the resuspended sample every three weeks.

Preparation of Phage Stock:

1) Inoculate 3 ml of TSB in a tube with a colony of host E. coli (ATCC # 15597) using a loop. Incubate the tube at 37° C. for 24 hr. at which time the E. coli will be in the stationary phase.
2) Inoculate a 150 ml Erlenmeyer flask holding 100 ml of TSB with 1 ml of host E. coli produced in 1). Incubate at 37° C. for 3 hr. while rotating on a shaker table (150–180 rpm). After the 3 hr. time period, the E. coli will be in log phase and ready for use.
3) Prepare a $10^5$ plaques/ml dilution of stock phage (resuspended phage will typically have approximately $10^{11}$ plaques/ml in the stock). Serial dilutions of the phage are made in sterile tris buffered saline at pH 7.0. A serial dilution is performed by taking 0.3 ml of the phage and adding to 2.7 ml of tris buffered saline at pH 7.0 to give a $10^{-1}$ dilution. 0.3 ml of the $10^{-1}$ dilution is added to 2.7 ml of tris buffered saline at pH 7.0 to give a $10^{-2}$ dilution. The serial dilution is continued until a $10^{-6}$ dilution is produced. The phage concentration at this point should be at the desired $10^5$ plaques/ml dilution. Tubes should be vortexed between dilutions and a new pipette should be used between dilutions to avoid carry-over.
4) Melt several tubes of top agar (TSB with 1% Bacto agar (Difco, (Becton/Dickinson, Spark, Md.) by placing them in a steamer with a water bath set at 48° C. Add 1 ml of log phase host E. coli per tube. Add 0.1 ml of diluted phage per tube (phage at approximately $10^5$ plaques/ml dilution). Gently vortex and then pour each tube onto solid TSA in a 92 mm×16 mm Petri dish. Let the agar solidify, invert and incubate at 37° C. for 24 hr.
5) After plaques are confluent, add 6 ml of tris buffered saline at pH 7.0 per plate and let it sit at room temperature for 2 hr. to allow the phage to diffuse through the solution. Decant off the eluent and then centrifuge at 10,000 rpm for 10 min.
6) Prepare a sterile 0.2 μm filter (Costar, Cambridge, Miss.) by passing 5 ml of 3% Beef Extract (Becton/Dickinson, Spark, Md.) through to remove the charge from the filter, then pass the supernatant from the centrifuge tube through the filter.

Titer by performing a plague assay and store the stock at 4° C. Try to get $10^3$–$10^5$ plaques/plate. 24 plates will produce about 50 ml of $10^{11}$ plaques.

The plaque assay is as follows: The phage solution is serially diluted in Tris buffered saline (Trisma, St. Louis, Mo.). The serial dilution is performed by taking 0.3 ml of phage solution and adding to 2.7 ml of tris buffered saline. The dilution is continued until a $10^{-4}$, dilution is produced.

The 3 ml dilution is added to 3 ml of molten (46° C.) top agar containing 0.1 ml of log-phase culture of E. coli host (ATCC: E. coli # 15597). The suspension is gently vortexed and poured onto solid tryptic soy agar plates. The solid tryptic soy agar plates, along with the top agar solution that has been added, is incubated for 18–24 hr. at 37° C. and then enumerated by counting plaques formed on the lawn of host E. coli cells.

(3). Craptosporidium Parvum

Cryptosporidium Parvum (Pleasant Hill Farms, Troy, ID) is directly added to the water used for testing. Stock titer is determined using 10 ml of cryptosporidium parvum centrifuged in a to IEC Clinical Centrifuge (Needhan Hts, MA) at 400 g's for 15 min. to pellet the oocysts. The supernatant is aspirated off 1 ml above the pellet. The oocysts are counted using a SPotlite hemocytometer (Baxter Healthcare Corp. McGraw Park, EL) by placing 0.2 ml of sample onto the hemocytometer and using a phase contrast microscope (e.g., BH-2 Olympus, Japan) at 400× magnification. At least 12 chamber aliquots are counted for each sample according the procedure outlined in the Guidance Manual (U.S. EPA, October 1990). An average of all readings is multiplied with the conversion factor of $1.0\times10^4$. Total numbers of cysts are divided by 10 to determine the number of oocysts per ml of sample.

B. Influent Preparation

Influent test fluid is prepared by adding (seeding) the requisite volume of concentrated stock for each microorganism to 100 L of dechlorinated and sterilized water. The microorganisms are seeded into the 100 L of water as the water is stirred with a 2 in. by ½ in. stir bar at maximum speed. The target concentration in the influent, based on the dilution from the concentrated stock, are listed in Table C. A 50 ml sample of influent is collected into a 50 ml graduated conical centrifuge tube for assay of MS-2 bacteriophage, E. coli, and Cryptosporidium parvum. Assay conditions for assessing removal of each of the microorganisms are described below.

The following is an example of how to calculate the volume of microorganisms to be added to 100 L of water for testing.

Example: If the concentration of E. coli is estimated to be $1\times10^9$ organisms/ml and the target concentration in 100 liters of water is $5\times10^8$ organisms/L, 50 ml of the stock E. coli needs to be added to 100 liters to obtain this concentration. The calculation is as follows:

$$1\times10^9 \text{organisms}/ml * Y\ ml\ \text{added}/100\ \text{liters}=5\times10^8 \text{organisms/liter},$$

then $$Y\ ml\ \text{added}=(5\times10^8 \text{organisms}/L * 100\ L)/(1\times10^9 \text{organism}/ml),$$

then $$Y\ ml\ \text{added}=50\ ml$$

TABLE C

| Microorganism | Microorganisms/L |
| --- | --- |
| E. coli | $5 \times 10^8$ |
| MS-2 | $5 \times 10^8$ |
| C. parvum | $6 \times 10^6$ |

C. Microorganism Filtration

A test filter is connected to an EXPERT Peristaltic pump (model CP-120) produced by Scilog, Inc. (Madison, Wis.), or an equivalent pump, using Pharmed tubing (¼ in. ID with 1/16 in. wall thickness). The pump is calibrated to a flow rate of 100 ml/min. using dechlorinated and sterile water.

Influent is flowed through the test filter at a rate of 100 ml/min. for 15 hr. 50 ml samples of effluent are collected into 50 ml graduated conical centrifuge tubes for assay of MS-2 bacteriophage and E coli at 1 hr., 3 hr., 6 hr., 10 hr. and 15 hr. Three 50 nml samples of effluent are collected into graduated conical centrifuge tubes for assay of *Cryptosporidium parvum* at the same time intervals as above. Table D outlines the amount of sample needed to perform an assay of each microorganism.

TABLE D

| Microorganism | Influent (ml/sample needed) | Effluent (ml/sample needed) |
| --- | --- | --- |
| E. coli | 1 | 1 |
| MS-2 | 1 | 1 |
| C. parvum | 10 | 100 |

D. Assay Conditions for Determining Pathogen Removal Indices (1). Bacteria Removal Index The Bacteria Removal Index is determined according to the following formula:

$$BRI = [1 - (\text{Effluent Concentration})/(\text{Influent Concentration})] \times 100$$

Bacteria assay is conducted using the membrane filter technique according to "Standard Methods for the Examination of Water and Wastewater" (American Public Health Association (APHA), 20$^{th}$ edition, method #9222) on m-Endo Agar LES (Becton Dickinson Co., Cockeysville, Md.; Cat. #: 4311203). Serial dilution of influent samples is made in sterile tris buffered saline at pH 7.0. A serial dilution is performed by taking 0.3 ml of influent and adding it to 2.7 ml of tris buffered saline at pH 7.0 to give a 10:1 dilution. 0.3 ml of the 10:1 dilution is added to 2.7 ml of tris buffered saline (Trisma, Inc., St. Louis, Mo.) at pH 7.0 to give a 10:1 dilution. The serial dilution is continued until a $10^6$:1 dilution is produced. A serial dilution of effluent samples collected from the test units is performed until a $10^4$:1 dilution is produced. The influent and effluent dilution assays and measurements are performed in duplicate according to "Standard Methods for the Examination of Water and Wastewater" (APHA, 20$^{th}$ edition, method # 9222).

(2). Virus Removal Index

The Virus Removal Index is determined according to the following formula:

$$VRI = [1 - (\text{Effluent Concentration})/(\text{Influent Concentration})] \times 100$$

Influent or effluent samples are serially diluted in tris buffered saline in the same manner as the *E. coli* samples by taking 0.3 ml of influent or effluent and adding to 2.7 ml of tris buffered saline. The dilution is continued until a $10^4$:1 dilution is produced. The 3 ml dilution is added to 3 ml of molten (46° C.) top agar (tryptic soy broth with 1% Bacto agar, Difco; Becton/Dickinson, Inc., Spark, Md.) containing 0.1 ml of log-phase culture of *E. coli* host (ATCC # 15597). The suspension is gently vortexed and poured onto solid tryptic soy agar plates. The tryptic soy agar (Difco; Becton/Dickinson, Inc.) is prepared by adding 40 g of the powder to 1 L of purified water in a 2 L Erlenmeyer flask set on a stir/hot plate. A 2 in. ×½ in. stir bar is added to the Erlenmeyer flask and the stir/hot plate is turned up to a medium setting. The tryptic soy agar solution is mixed thoroughly on the stir/hot plate and heated to boiling for 1 min. The solution is then autoclaved for 15 min. at 121° C. 15 ml of the tryptic soy agar is poured into a 92 mm×16 mm sterile Petri dish then cooled to produce the solid tryptic soy agar plate. The solid tryptic soy agar plates, along with the top agar solution that has been added, is incubated for 18–24 hr. at 37° C. and then enumerated by counting plaques formed on the lawn of host *E. coli* cells.

(3). Parasite/Protozoa Removal Index

The Parasite Removal Index is determined according to the following formula:

$$PRI = [1 - (\text{Effluent Concentration})/(\text{Influent Concentration})] \times 100$$

The *Cryptosporidium parvum* assay for measuring PRI is conducted by taking 10 ml of influent or 100 ml of effluent samples collected from the filters. The samples are centrifuged in a IEC Clinical Centrifuge (Needhan Hts, MA) at 400 g's for 15 min. to pellet the oocysts. The supernatant is aspirated off 1 ml above the pellet. The oocysts are counted using a SPotlite hemocytometer (Baxter Healthcare Corp. McGraw Park, IL) by placing 0.2 ml of sample onto the hemocytometer and using a phase contrast microscope (BH-2 Olympus, Japan) at 400× magnification. At least 12 chamber aliquots are counted for each sample according to the procedure outlined in the Guidance Manual (U.S. EPA, October 1990). An average of all readings is multiplied with the conversion factor of $1.0 \times 10^4$. Total numbers of cysts are then divided by 10 for influent samples and by 100 ml for effluent samples to determine the number of oocysts per ml of sample.

What is claimed is:

1. A filter comprising activated carbon fibers, wherein the activated carbon fibers are arranged so that the filter has a Virus Removal Index (VRI) of at least about 99.99% at a flow rate of 100 ml/min and an MS2 influent concentration of $5 \times 10^8$, wherein the flow rate is maintained for at least one hour, wherein said activated carbon fibers are provided in the form of an activated carbon fiber composite and wherein said composite has a cured density prior to activation of between substantially 0.1–0.7 g/cm$^3$, an activated density following activation of between substantially 0.05–0.55 g/cm$^3$ and a burnoff during activation between substantially 0–90%.

2. The filter of claim 1 having a VRI of at least about 99.999% at a flow rate of 100 m/min and an MS2 influent concentration of $5 \times 10^8$, wherein the flow rate is maintained for at least one hour.

3. The filter of claim 1 having a VR1 of from about 99.99% to about 99.9999% at a flow rate of 100 ml/min and an MS2 influent concentration of $5 \times 10^8$, wherein the flow rate is maintained for at least one hour.

4. The filter of claim 1 having a Bacteria Removal Index (BRI) of at least about 99.9999% at a flow rate of 100 ml/min and an *E. coli* influent concentration of $5 \times 10^8$, wherein the flow rate is maintained for at least one hour.

5. The filter of claim 1 having a Parasite Removal Index (PRI) of at least about 99.9% at a flow rate of 100 ml/min and a *Cryptosporidium parvum* influent concentration of $6\times10^6$, wherein the flow rate is maintained for at least one hour.

6. The filter of claim 1, wherein said burnoff during activation is between substantially 0–80%.

7. The filter of claim 6, wherein said activated carbon fiber composite has a void volume of between substantially 63–95% and a mean inter-fiber spacing of between substantially 30–302 μm.

8. The filter of claim 7, further having a micropore volume of between substantially 0–0.78 cc/g and a BET surface area of between substantially 0–4000 $m^2/g$.

9. The filter of claim 6, wherein said activated carbon fiber composite has a void volume between substantially 71–81% and a mean inter-fiber spacing of between substantially 42–73 μm.

10. The filter of claim 9, further having a micropore volume of between substantially 0.37–0.51 g/cc and a BET surface area of between substantially 600–1500 $m^2/g$.

11. The filter of claim 1, wherein said activated carbon fibers are provided in the form of an activated carbon fiber composite and wherein said composite has: (i) a cured density prior to activation of between substantially 0.36–0.55 $g/cm^3$, (ii) an activated density following activation of between substantially 0.076–0.495 $g/cm^3$, and (iii) a burnoff during activation of between substantially 21–45%.

12. The filter of claim 11, further having (iv) a void volume between substantially 63–95% and (v) a mean inter-fiber spacing of between substantially 30–302 μm.

13. The filter of claim 12, further having (iv) a void volume between substantially 71–81% and (v) a mean inter-fiber spacing of between substantially 42–73 μm.

14. The filter of claim 13, further having (vi) a micropore volume of between substantially 0.37–0.51 cc/g and a BET surface area of between substantially 600–1500 $m^2/g$.

15. The filter of claim 12 further having (vi) a micropore volume of between substantially 0–0.78 cc/g and a BET surface area of between substantially 0–4000 $m^2/g$.

16. The filter of claim 11, wherein said carbon fiber composite filter has a ratio of cured density to activated density of between substantially 1.1:1 to 4.7:1.

17. The filter of claim 1, wherein said filter is prepared by the steps of:

(i) mixing between one part by weight carbon fibers having a diameter between substantially 5–100 μm and a length between substantially 0.1–0.4 mm with between 0.05–1.0 part by weight binder and 5–50 part by weight water in order to produce a slurry;

(ii) placing said slurry in a molding vessel;

(iii) filtering said slurry thereby producing a green monolithic body;

(iv) dewatering and drying said green monolithic body;

(v) curing said green monolithic body thereby producing a cured monolithic body;

(vi) carbonizing said cured monolithic body thereby producing a carbon fiber composite defining an open, permeable structure; and (vii) activating said carbon fiber composite whereby said carbon fibers are made porous.

18. The filter of claim 1, wherein said filter is prepared by the steps of:

(i) mixing between 2–12 weight percent of carbon fibers having a diameter between substantially 5–100 μm and a length between substantially 0.1–0.4 μm with between 1.25–3.0 weight percent binder and 8–50 cc of water per gram of carbon fibers in order to produce a slurry;

(ii) placing said slurry in a molding vessel;

(iii) filtering said slurry thereby producing a green monolithic body;

(iv) dewatering and drying said green monolithic body;

(v) curing said green monolithic body thereby producing a cured monolithic body;

(vi) carbonizing said cured monolithic body thereby producing a carbon fiber composite defining an open permeable structure; and (vii) activating said carbon fiber composite whereby said carbon fibers are made porous and said composite has an activated density of substantially 0.076–0.495 $g/cm^3$.

19. The filter of claim 1, wherein the filter has a mean inter-fiber spacing between about 30.3 μm and about 302 μm.

20. The filter of claim 1, wherein the activated carbon fibers have a specific surface area between about 100 $m^2/g$ and about 4000 $m^2/g$.

21. The filter of claim 1, wherein the filter has a bulk density between about 0.15 $g/cm^3$ and about 0.8 $g/cm^3$.

22. A filter comprising a filter material consisting essentially of activated carbon fibers having a specific surface area between about 100 $m^2/g$ and about 4000 $m^2/g$, wherein the activated carbon fibers are arranged so that the filter has a Virus Removal Index (VRI) of at least about 99.99% at a flow rate of 100 ml/min and an MS2 influent concentration of $5\times10^8$, wherein the flow rate is maintained for at least one hour, and wherein the filter has a mean inter-fiber spacing between about 30.3 μm and about 302 μm and a bulk density between about 0.15 $g/cm^3$ and about 0.8 $g/cm^3$.

23. The filter of claim 22, wherein the filter has a VRI of at least about 99.999% at a flow rate of 100 ml/min and an MS2 influent concentration of $5\times10^8$, wherein the flow rate is maintained for at least one hour.

24. The filter of claim 23, wherein the activated carbon fibers are free.

25. The filter of claim 23, wherein the activated carbon fibers are formed into a composite.

26. The filter of claim 23, wherein a mixture of activated carbon fibers of different mean diameter, length and/or shape are utilized.

* * * * *

UNITED STATES PATENT AND TRADEMARK OFFICE
CERTIFICATE OF CORRECTION

PATENT NO. : 6,852,224 B2
DATED : February 8, 2005
INVENTOR(S) : Marit Jagtoyen et al.

It is certified that error appears in the above-identified patent and that said Letters Patent is hereby corrected as shown below:

Column 44,
Line 55, after, "...rate of 100", delete "m/min" and insert -- ml/min --.

Signed and Sealed this

Twenty-fourth Day of May, 2005

JON W. DUDAS
*Director of the United States Patent and Trademark Office*